United States Patent

Takenaka et al.

[11] Patent Number: 5,917,908
[45] Date of Patent: Jun. 29, 1999

[54] FILE PROTECTION SYSTEM, SOFTWARE UTILIZATION SYSTEM USING THE FILE PROTECTION SYSTEM AND STORAGE MEDIUM USED IN THE SOFTWARE UTILIZATION SYSTEM

[75] Inventors: Masahiko Takenaka; Takayuki Hasebe; Naoya Torii; Noboru Iwayama, all of Kawasaki, Japan

[73] Assignee: Fujitsu Limited, Kawasaki, Japan

[21] Appl. No.: 08/623,682

[22] Filed: Mar. 29, 1996

[30] Foreign Application Priority Data

Jun. 7, 1995 [JP] Japan .................................. 7-140497

[51] Int. Cl.[6] .............................. G11B 23/28; H04L 9/00; H04K 1/00
[52] U.S. Cl. ...................................... 380/3; 380/4; 380/25
[58] Field of Search ........................ 380/3, 4, 25

[56] References Cited

U.S. PATENT DOCUMENTS

| | | | |
|---|---|---|---|
| 5,065,429 | 11/1991 | Lang | 380/25 |
| 5,327,563 | 7/1994 | Singh | 380/4 |
| 5,337,357 | 8/1994 | Chou et al. | 380/4 |
| 5,351,294 | 9/1994 | Matsumoto et al. | 380/4 |
| 5,357,573 | 10/1994 | Walters | 380/25 |
| 5,371,792 | 12/1994 | Asai et al. | 380/3 |
| 5,392,351 | 2/1995 | Hasebe et al. | 380/4 |
| 5,412,718 | 5/1995 | Narasimhalu et al. | 380/4 |
| 5,661,799 | 8/1997 | Nagel et al. | 380/4 |
| 5,661,800 | 8/1997 | Nakashima et al. | 380/4 |
| 5,689,560 | 11/1997 | Cooper et al. | 380/4 |

*Primary Examiner*—Harshad Patel
*Assistant Examiner*—Robin C. Clark
*Attorney, Agent, or Firm*—Staas & Halsey, LLP

[57] ABSTRACT

A file protection system for protecting a file which is stored in a storage unit includes a storage position deciding unit for deciding a positional-information corresponding to an area in which information of the file is stored in the storage unit and an encryption unit for encrypting the information of the file in accordance with a predetermined algorithm using at least a part of the positional-information decided by the storage position deciding unit. Information obtained by the encryption unit is stored in the area identified by the positional-information in the storage unit. A file protection system is operable when information of a file which was encrypted as described above is read out from a storage unit. The file protection system includes a decryption unit for decrypting the encrypted information of the file which is read out from an area in the storage unit using information corresponding the area, an extracting unit for extracting the positional-information from information obtained by the decryption unit, and a determination unit for determining whether or not the positional-information extracted by the extracting unit is equal to corresponding positional-information which is at least a part of the information corresponding to the area from which the encrypted information of the file is read out. When the determination unit determines that two pieces of positional-information are not equal to each other, it is determined that the information obtained by the decryption unit does not include correct information of the file.

28 Claims, 23 Drawing Sheets

FIG. 8
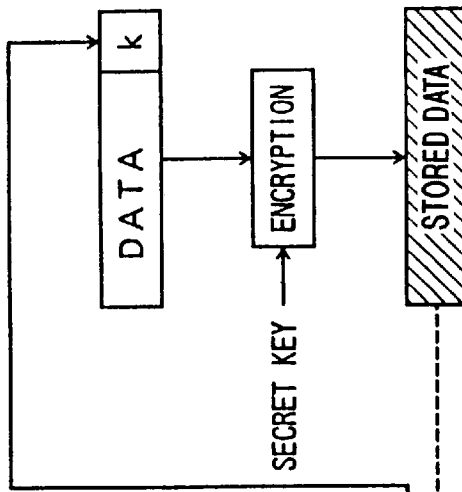
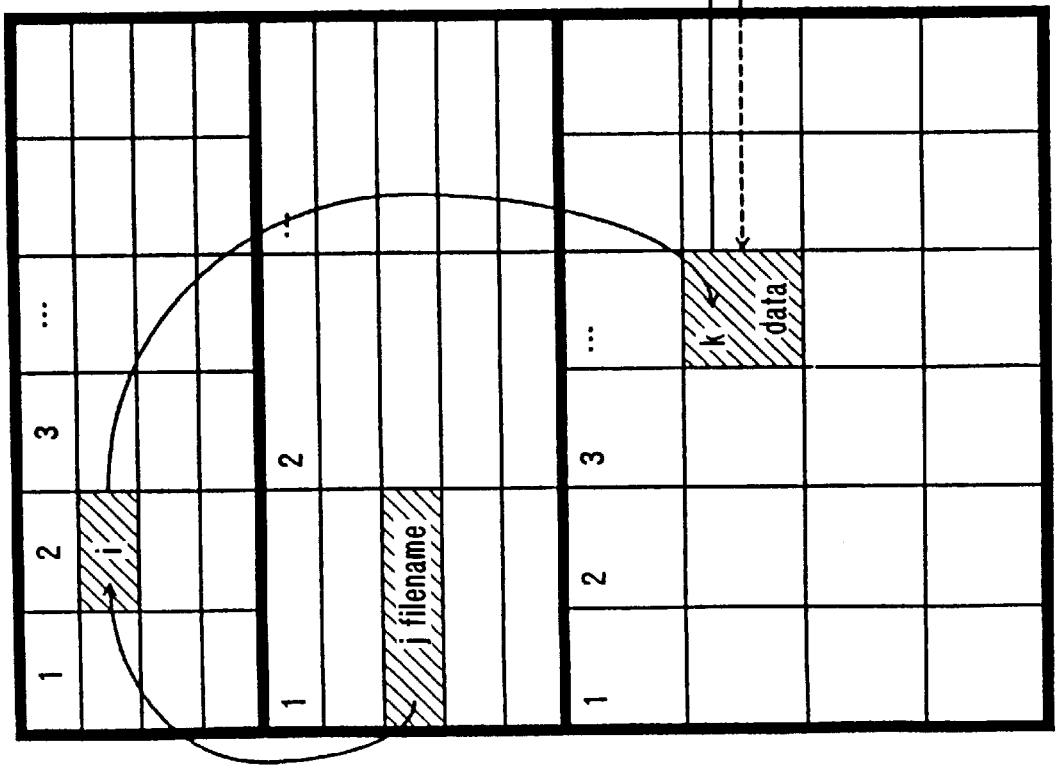

FILE PROTECTION SYSTEM, SOFTWARE UTILIZATION SYSTEM USING THE FILE PROTECTION SYSTEM AND STORAGE MEDIUM USED IN THE SOFTWARE UTILIZATION SYSTEM

BACKGROUND OF THE INVENTION (1) Field of the Invention

The present invention generally relates to a file protection system for protecting various types of information (files) in a computer system from unfair use, a software utilization system using the file protection system and a storage medium such as a CD-ROM in which software is stored, and more particularly to a file protection system which can exactly detect whether files have been moved or copied from another computer system or have been altered, a software utilization system in which only authorized users can use software by using the file protection system and a storage medium used in the software utilization system.

(2) Description of the Related Art

In recent years, a software sales method has been proposed. In this software sales method, a storage medium, such as a CD-ROM or a magneto-optical disk (MO), in which software is stored in a protected state and a license (a key) used to release the software from the protected state are separately sold. For example, as shown in FIG. 1, software (applications etc.)(hereinafter referred to as a software-article-1) for which a lock 110 is set (encryption) is stored in a CD-ROM 100. The CD-ROM 100 and a key (a license) 120 used to set the lock 110 for the software-article-1 are separately sold to a user A. The key (the license) 120 which is used for a lock 121 specific to the user A is given to the user A. The lock 121 is opened (decryption) by a key 210 which is stored as a key specific to the user A in a computer system 200 (for the user A) in which software is utilized. As a result, the software-article-1 can be used in the computer system 200.

A user B may have a key 310 specific to the user B but does not have the key 210 specific to the user A. Thus, even if the user B unjustly gets the key 120, the lock 121 for the key 120 can not be opened by the user B. That is, the software-article-1 stored in the protected state as described above in the CD-ROM 100 is unusable in a computer system 300 for the user However, if the key 210 specific to the user A and the software-article-1 both of which are stored in the com uter system 200 for the user A are copied and installed in the other computer systems, the software-article-1 can be used in other computer systems.

SUMMARY OF THE INVENTION

Accordingly, a general object of the present invention is to provide a novel and useful file protection system, software utilization system and a storage medium in which the disadvantages of the aforementioned prior art are eliminated.

A specific object of the present invention is to provide a file projection system by which files, such as a file for the key specific to the user A, which should be secret is prevented from being copied and installed in another computer system.

The above objects of the present invention are achieved by a file protection system for protecting a file stored in a storage unit that includes storage position deciding means for deciding positional-information corresponding to an area in which information of the file is stored in the storage unit; and encryption means for encrypting the information of the file in accordance with a predetermined algorithm using at least a part of the positional-information decided by the storage position deciding means, wherein information obtained by the encryption means is stored in the area identified by the positional-information in the storage unit.

The above objects of the present invention are also achieved by a file protection system used when information of a file which was encrypted using positional-information is read out from a storage unit, the positional-information being at least a part of the information corresponding to an area in which encrypted information was stored in the storage unit. The file protection system includes decryption means for decrypting the encrypted information of the file which is read out from an area in the storage unit using information corresponding to the area, in accordance with an algorithm corresponding to an algorithm in accordance with which the information of the file was encrypted; extracting means for extracting the positional-information which was used to encrypt the information of the file from information obtained by the decryption means; and determination means for determining whether or not the positional-information extracted by the extracting means is equal to corresponding positional-information which is at least a part of the information corresponding to the area from which the encrypted information of the file is readout. When the determination means determines that the positional-information extracted by the extracting means is not equal to the positional-information used to read out the encrypted information of the file, it is determined that the information obtained by the decryption means does not include correct information of the file.

According to the present invention, information read out from the storage unit and decrypted reflects the positional-information. Thus, based on the difference between the positional-information obtained by decrypting the information read out from the storage unit and the positional-information actually used to read out the encrypted information from the storage unit, it can be determined whether the information of a file has been unjustly moved or copied from another system.

Only when the positional information identifying an area in which the encrypted information is written is equal to the positional information identifying an area from which the encrypted information is read out, the encrypted information is accurately decrypted. Thus, files (provided with secret information, such as a pass-word) stored in the storage unit can be protected with high security.

Another object of the present invention is to provide a software utilization system using the file protection system described above.

The above objects of the present invention are achieved by a software utilization system that includes a storage unit for storing information in an area identified by positional-information supplied thereto; storage position deciding means for deciding positional-information used to store specific information which is information specific to the software utilization system in the storage unit; encryption means for encrypting the specific information using at least a part of the positional-information decided by the storage position deciding means in accordance with a predetermined algorithm; storage control means for storing information obtained by the encryption means in an area identified by the positional-information decided by the storage position deciding means in the storage unit; first decryption means for decrypting encrypted information which is read out from the storage unit using the positional information, in accordance with an algorithm according to the predetermined algorithm used by the encryption means to encrypt the specific information; extracting means for extracting the specific information and at least the positional-information used to encrypt the specific information from information obtained by the first decryption means; determination means for determining whether or not at least the part of the positional-information actually extracted by the extracting means is equal to a corresponding part of the positional-information used to read out the encrypted information from the storage unit; second decryption means for, when the determination means determines that at least the part of the positional-information actually extracted by the extracting means is equal to the corresponding part of the positional-information used to read out the encrypted information, decrypting a key using the specific information extracted by the extracting means, the key being supplied from an external system to decrypt encrypted software-articles and being encrypted by the specific information; and third decryption means for decrypting an encrypted software-article, supplied from an external system, using the key decrypted by the second decryption means.

According to the present invention, specific information for the software utilizing system is protected by the file protection system described above, and the software-article is protected by using the protected specific information. Thus, the software-article is prevented from being moved to and used in another system identified by other specific information.

Further, another object of the present invention is to provide a storage medium used in the software utilization system described above.

The above objects of the present invention are achieved by a storage medium used in a software utilization system for utilizing software-articles which are encrypted. The storage medium includes a region in which an encrypted software-article capable of being utilized in the software utilization system and information used to read out the encrypted software-article are recorded; and a region in which information used to generate specific information is stored, the specific information being information specific to the software utilization system.

According to the present invention, the information used to read out the encrypted software-article and the information used to generate the specific information are stored in the storage unit along with the encrypted software-article. Thus, the software-article encrypted using the specific information can be easily supplied to the software utilizing system. The specific information which is information specific to the software utilizing system can be generated.

BRIEF DESCRIPTION OF THE DRAWINGS

Other objects, features and advantages of the present invention will be apparent from the following description when read in conjunction with the accompanying drawings, in which:

FIG. 8 is a diagram illustrating an example of process for writing information of a file in the storage unit;

DETAILED DESCRIPTION OF THE PREFERRED EMBODIMENTS

A description will be given of an embodiment of the present invention.

Figure 1:
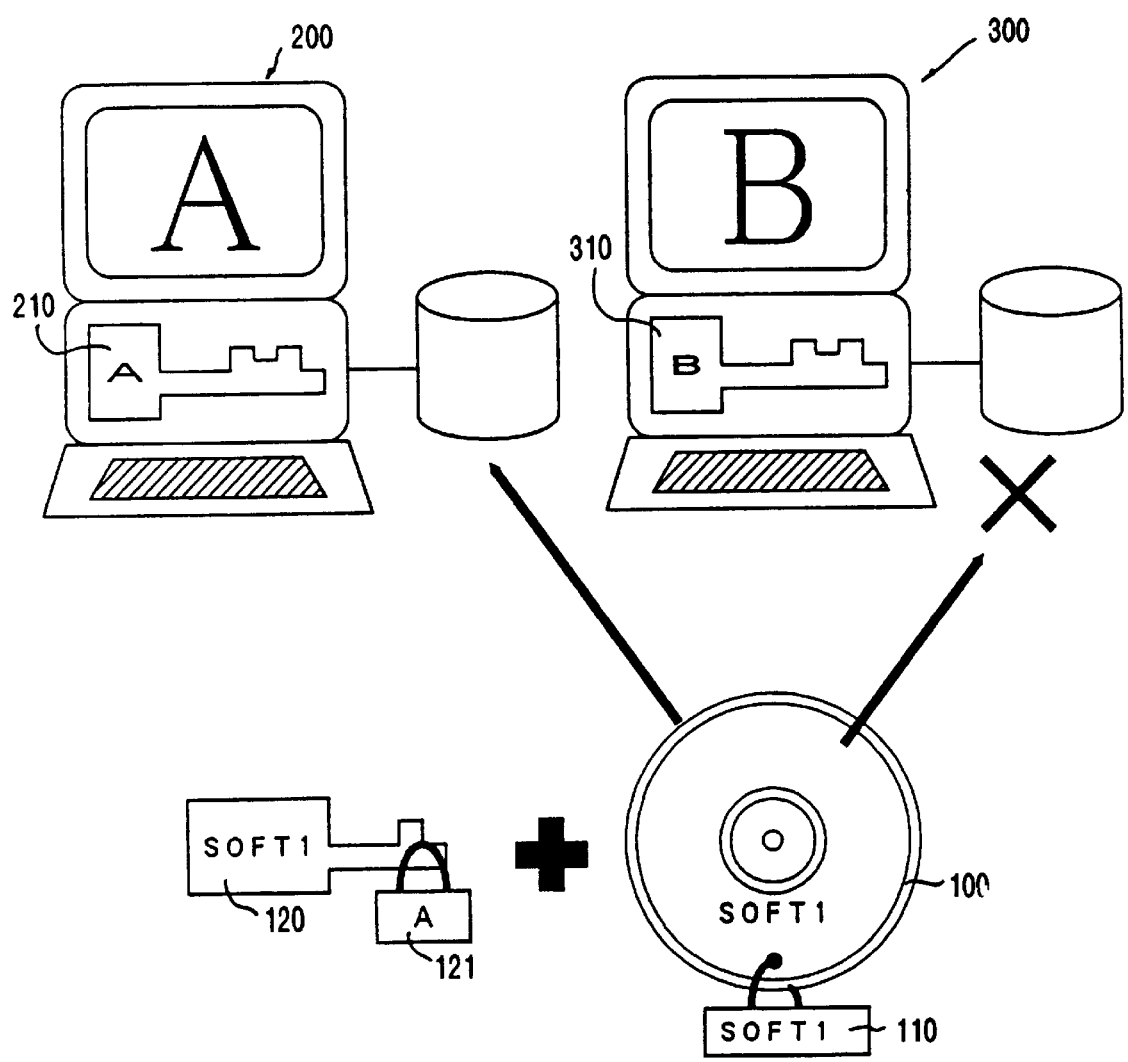
FIG. 1 is a diagram illustrating a software sales method which has been proposed.
Figure 2:
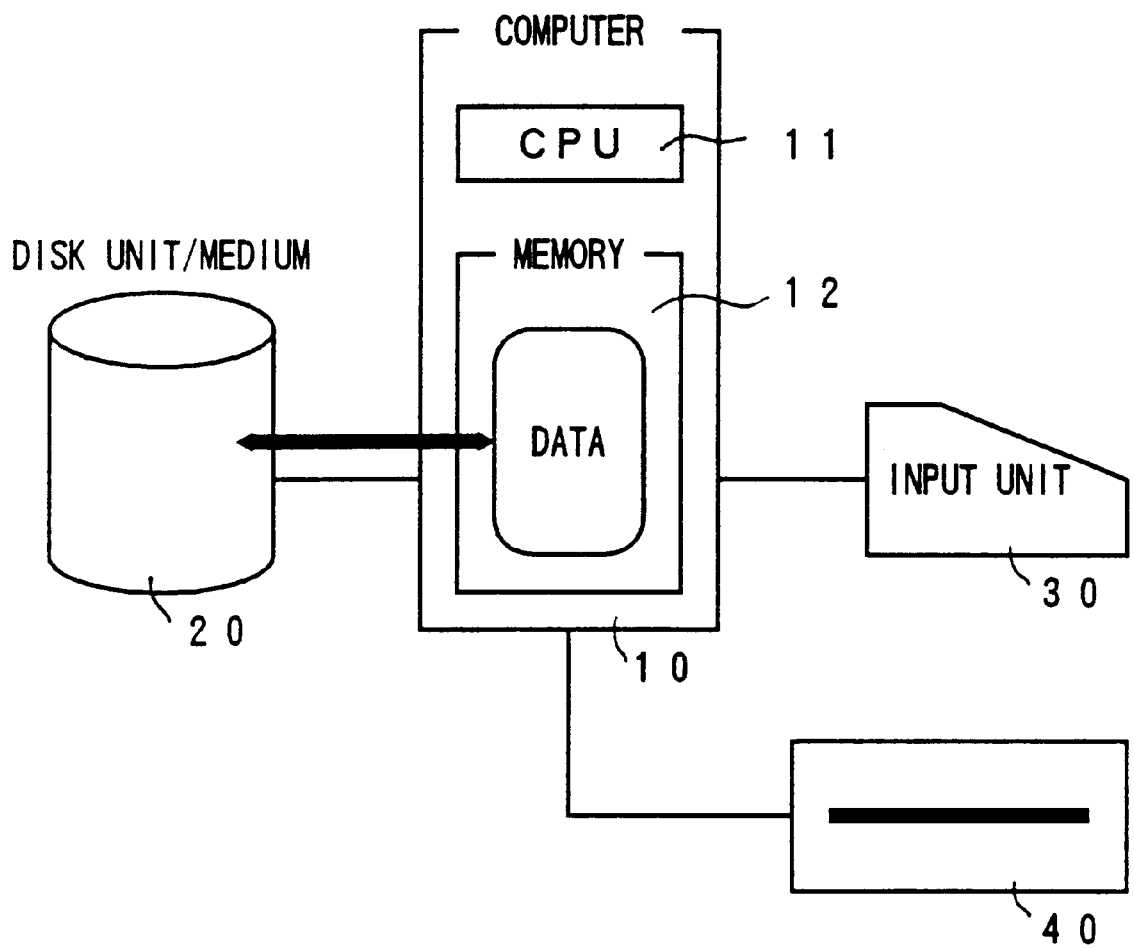
FIG. 2 is a diagram illustrating a user system to which a file protection system according to an embodiment of the present invention.

A user system (a computer system) to which a file protection system according to an embodiment of the present invention is applied is formed as shown in FIG. 2. Referring to FIG. 2, the user system has a computer unit 10, a storage unit 20, an input unit 30 and a CD-ROM driver 40. The storage unit 20 which is, for example, a hard-disk unit stores files (secret data) to be protected. The computer unit 10 is provided with a CPU 11 which controls various processes and a memory 12 used to store files read out from the storage unit 20. The CPU 11 of the computer unit 10 processes data in the memory 12 in accordance with information based on input operations of the user in the input unit 30. Software-articles (applications) desired by the user are read out from a CD-ROM loaded in the CD-ROM driver 40 and is installed into the storage unit 20.

Figure 3:
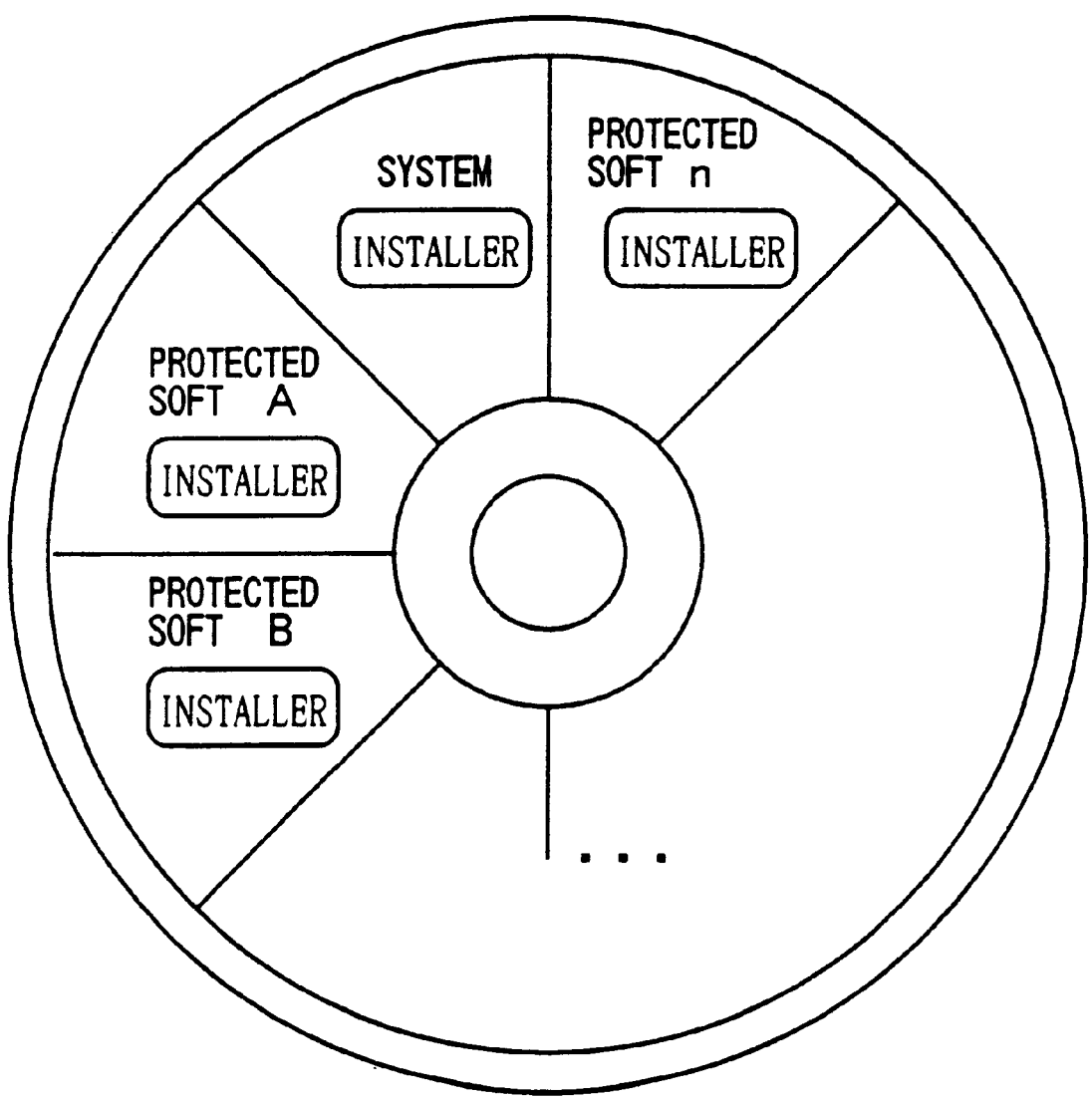
FIG. 3 is a diagram illustrating a storage medium (a CD-ROM) used to supply encrypted software articles and a system software article to the user system shown in FIG. 2.
Figure 4:
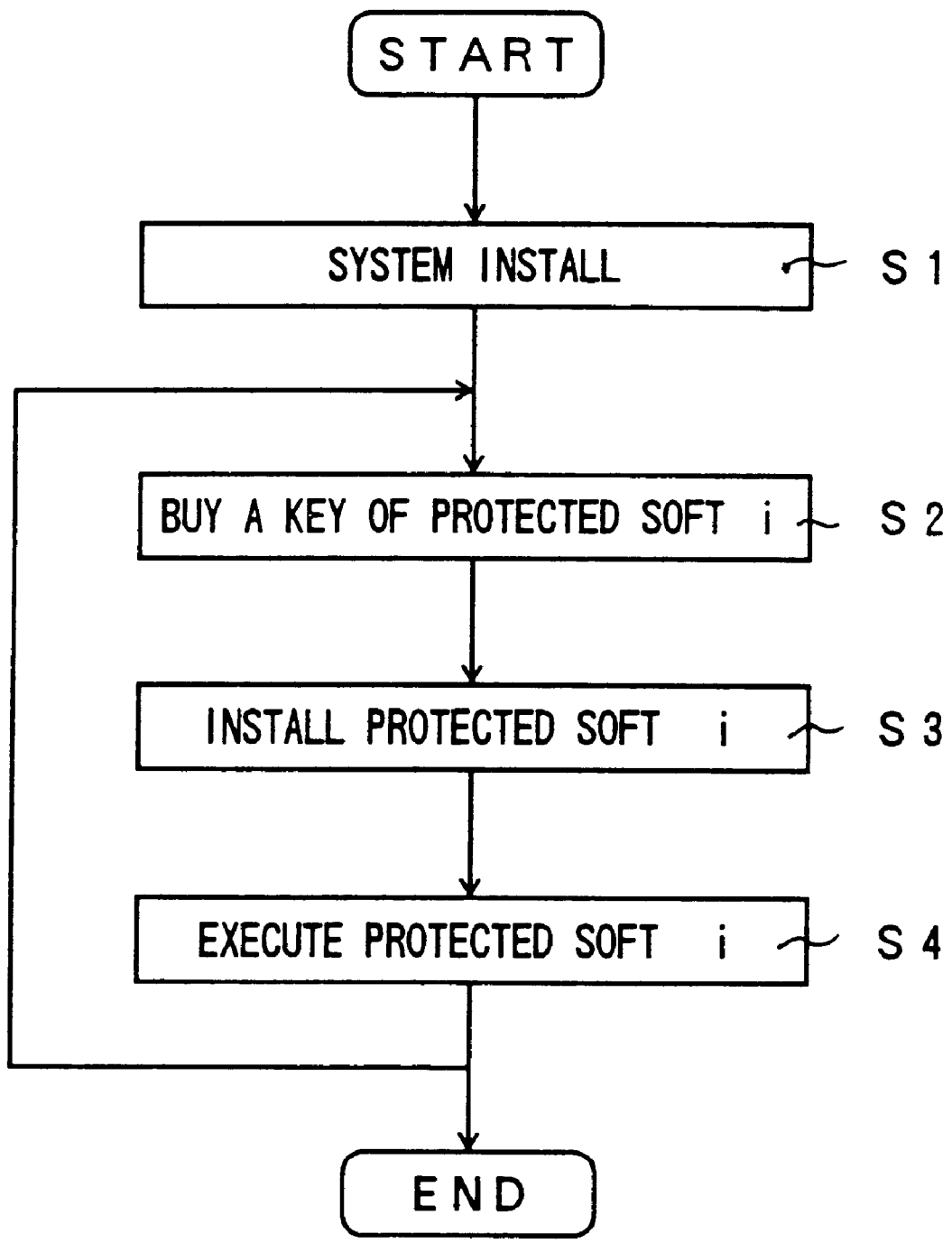
FIG. 4 is a flowchart illustrating a procedure in accordance which the an encrypted software-article is installed into the system.

The user of the computer system (the user system) buys a storage medium, such as a CD-ROM, in which a plurality of software-articles (e.g., applications) and the system software are stored as shown in FIG. 3. The respective software-articles and the system software and an installer are locked (encrypted) and stored in the CD-ROM. The user who bought this CD-ROM carries out operations for installing desired applications into the user system in accordance with a procedure shown in FIG. 4. Referring to FIG. 4, first of all, the system software in the CD-ROM is installed into the user system (S1). The user then buys a license (a key) for a desired software-article-i which is protected (encrypted) in the CD-ROM (S2). After this, the software-article-i is read out from the CD-ROM and installed in the user system (S3). The software-article-i is released from the protected state (decryption) by use of the license (the key) bought by the user, and executed in the user system as shown in FIG. 2 (S4).

Figure 5:
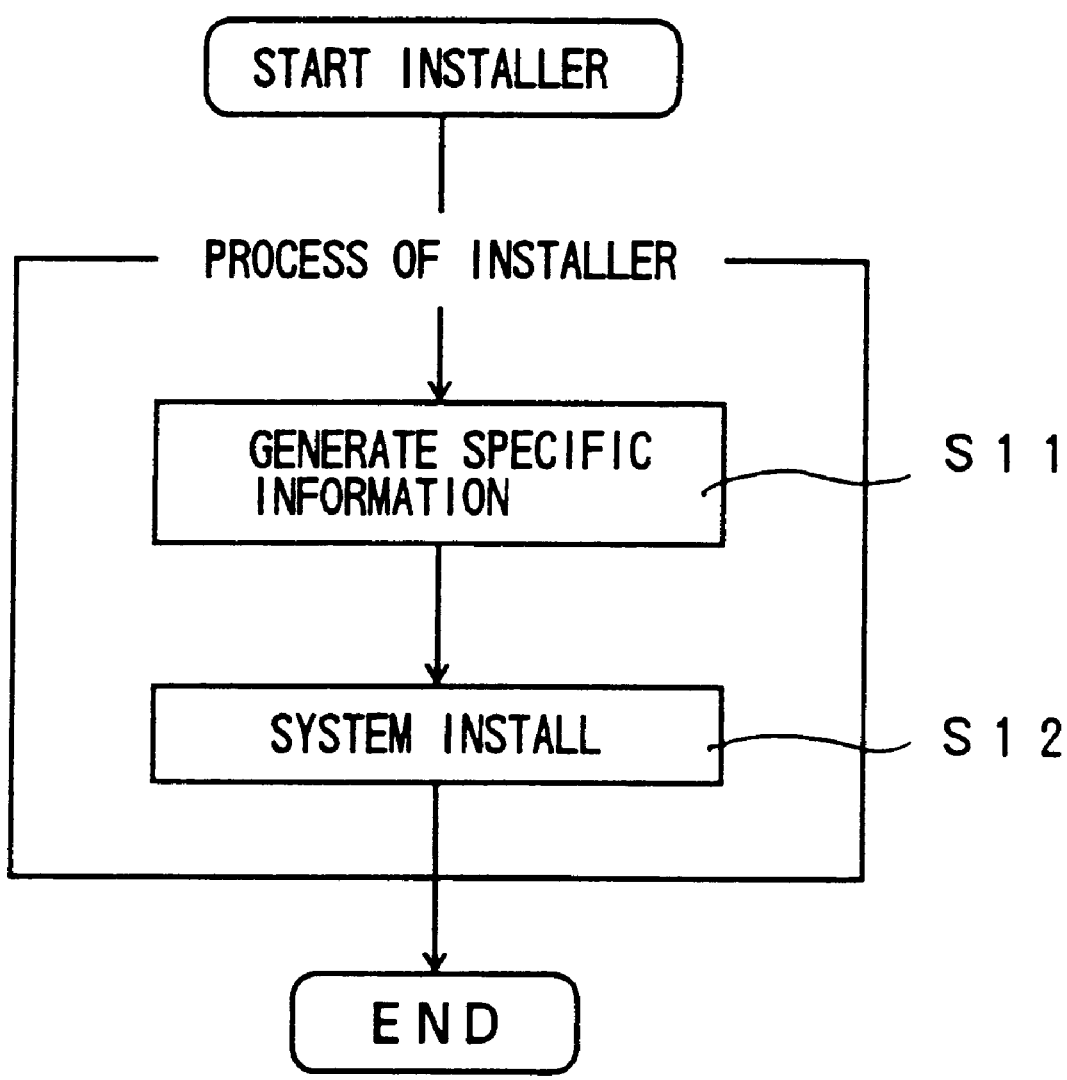
FIG. 5 is a block diagram illustrating functions of an installer for the system software-article stored in the storage medium shown in FIG. 3.

In the procedure described above, the system software is installed in the user system as shown in FIG. 5. That is, the CD-ROM as shown in FIG. 3 is set in the CD-ROM driver 40 and the installer for the system software is activated. The installer for the system software thus executes an installing process. In the installing process, machine specific information which is information specific to the user system as shown in FIG. 2 is generated (S11). The system software is then installed into the storage unit 20.

Figure 6:
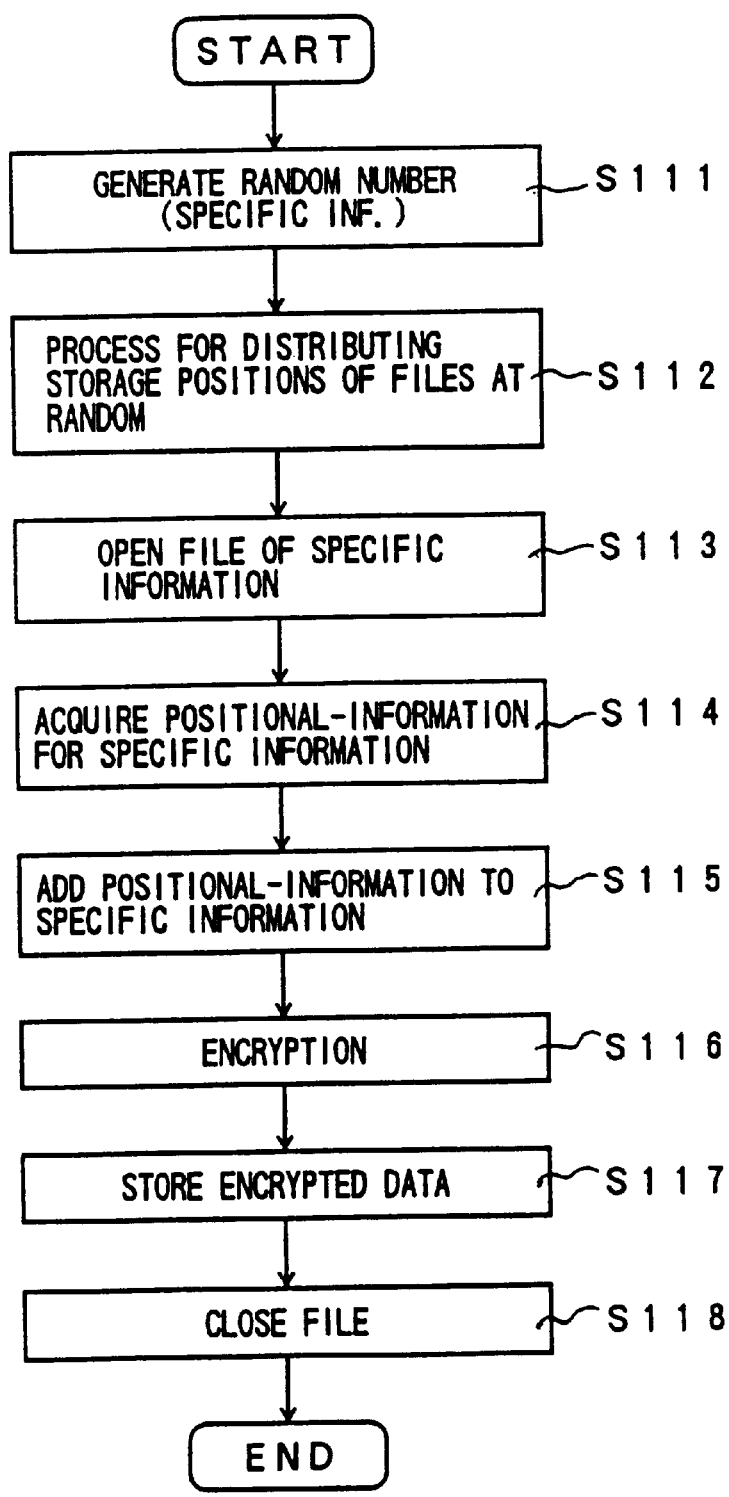
FIG. 6 is a flowchart illustrating a procedure in accordance with which files are stored in a storage unit using information specific to the user system.

The machine specific information is generated in accordance with a procedure shown in FIG. 6.

Referring to FIG. 6, random numbers are generated and a predetermined number of random numbers are selected from among the generated random numbers. A number in which respective digits are formed of the selected random numbers is used as the machine specific information. In addition, by using the generated random numbers, an address at which a file is stored in the storage unit 20 is decided (S112). Since addresses at which files are stored in the storage unit 20 are decided by using the random numbers, the files can be stored in the storage unit 20 at random.

Figure 7:
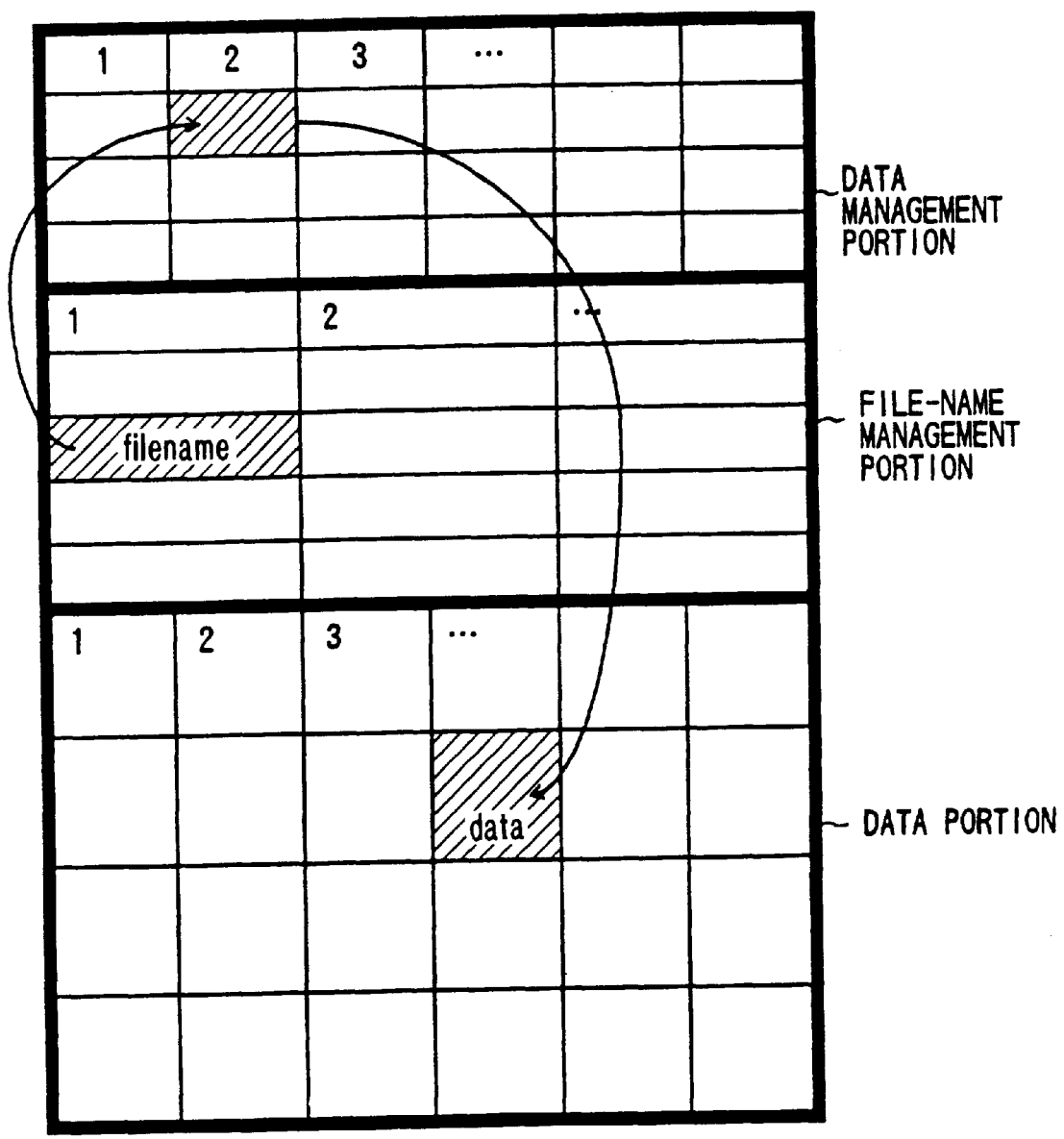
FIG. 7 is a diagram illustrating a logical structure of the storage unit.

A logical structure of the storage unit 20 is formed as shown in FIG. 7. That is, the storage unit 20 is divided into a data portion, a file-name management portion and a data management portion. The data portion is provided with data of files, the data management portion is used to manage positions at which files are stored in the data portion and the file-name management portion is used to manage relationships between names of files and the data management portion.

After a position (an address) at which a file should be stored in the storage unit 20 is decided as described above, the process is executed in accordance with the procedure after the step S112 shown in FIG. 6. The process is shown in FIG. 8. A description will now be given, with reference to FIG. 8, of the process after the step S112 shown in FIG. 6.

A file in which the machine specific information should be written is opened (S113). Positional-information items k, j and i identifying positions of areas used to store the file are respectively assigned to the data portion, the file-name management portion and the file management portion. The positional-information item k assigned to the data portion is acquired as additional data by the system (S114). After the positional-information item k is acquired by the system, the positional-information item k is added to the data (DATA) (the machine specific information) to be stored (S115). Data (DATA+k) into which the data (DATA) and the positional-information item k are integrated is encrypted by using a secret key which has been given to the user, so that encrypted data Ekey(DATA+k) is generated (S116). The encrypted data Ekey(DATA+k) is written in an area identified by the positional-information item k in the data portion (S117). After this, other information regarding the data (the machine specific information) are written in the respective areas identified by the positional-information items i and j in the file-name management portion and the data management portion. After the whole information is completely written in the respective areas, the file is closed (S116).

Figure 9:
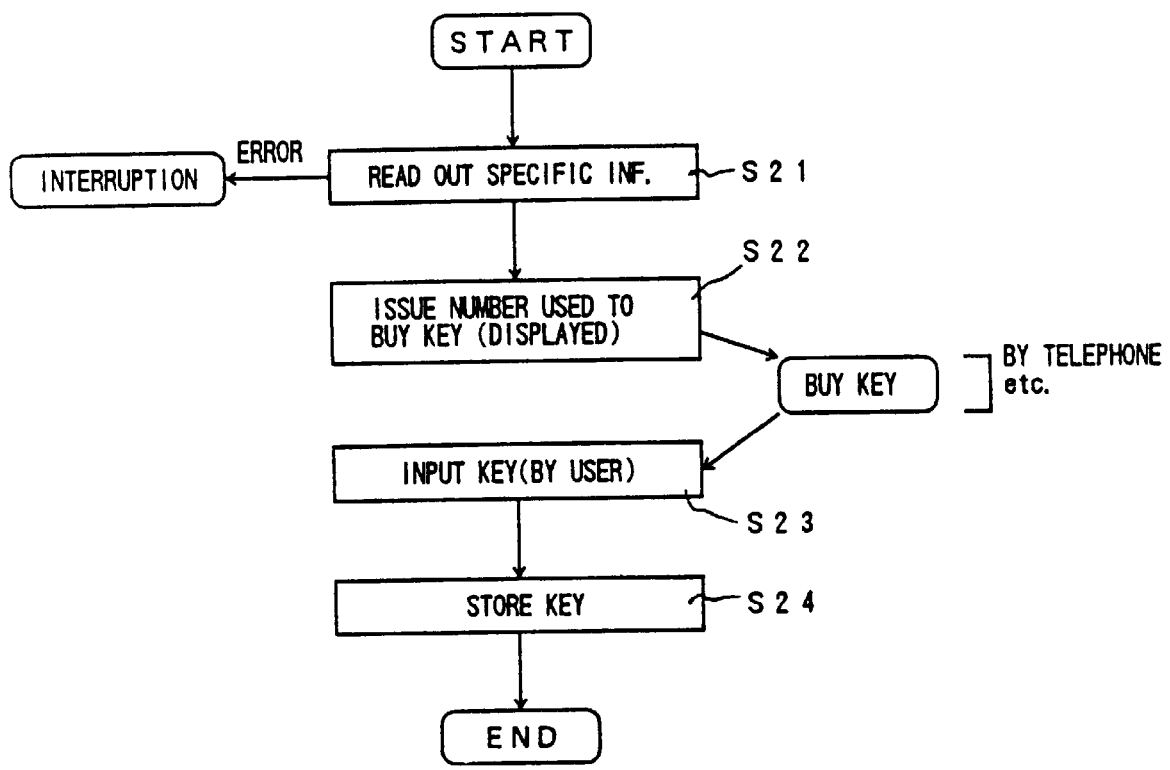
FIG. 9 is a flowchart illustrating a procedure in accordance with which a key used to decrypt the encrypted software-article is bought.

Next, a process for buying the key (the license) used to release the software from the protected state is carried out in the user system in accordance with a procedure as shown in FIG. 9.

Referring to FIG. 9, the machine specific information which has been encrypted as described above is read out from the storage unit 20 and is decrypted (S21). A detailed description of a process for reading out the machine specific information will be given later. After this, the user informs a center selling licenses of software about an ID number identifying the software-article-i and a key purchase number corresponding to the machine specific information by telephone or electronic-mail (S22). In the center which receives the ID number of the software-article-i and the key purchase number, the license (the key) used to open the lock (encryption) of the software-article-i is encrypted (locked) using the key purchase number corresponding to the machine specific information. The center informs the user of the locked key (the encrypted license) by telephone or electronic mail. The user then inputs to the user system the encrypted key (license) by using the input unit 30 (S23). The encrypted key (license) is stored in a predetermined area of the storage unit 20 (S24).

The process (S21) for reading out the machine specific information is carried out as follows.

Figure 10:
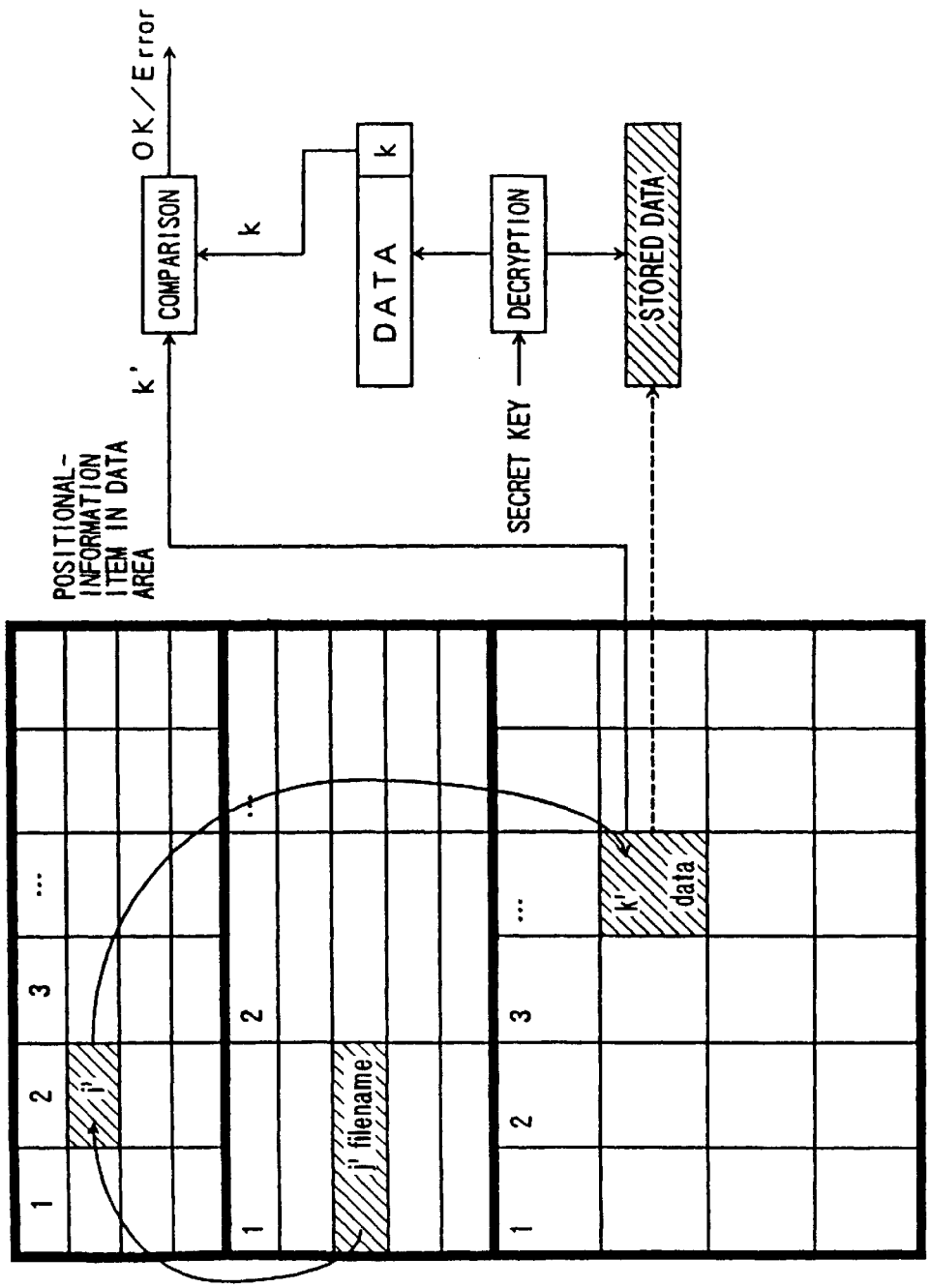
FIG. 10 is a diagram illustrating an example of a process for reading out the information of the file which was written in the storage unit by the process shown in FIG. 6.
Figure 11:
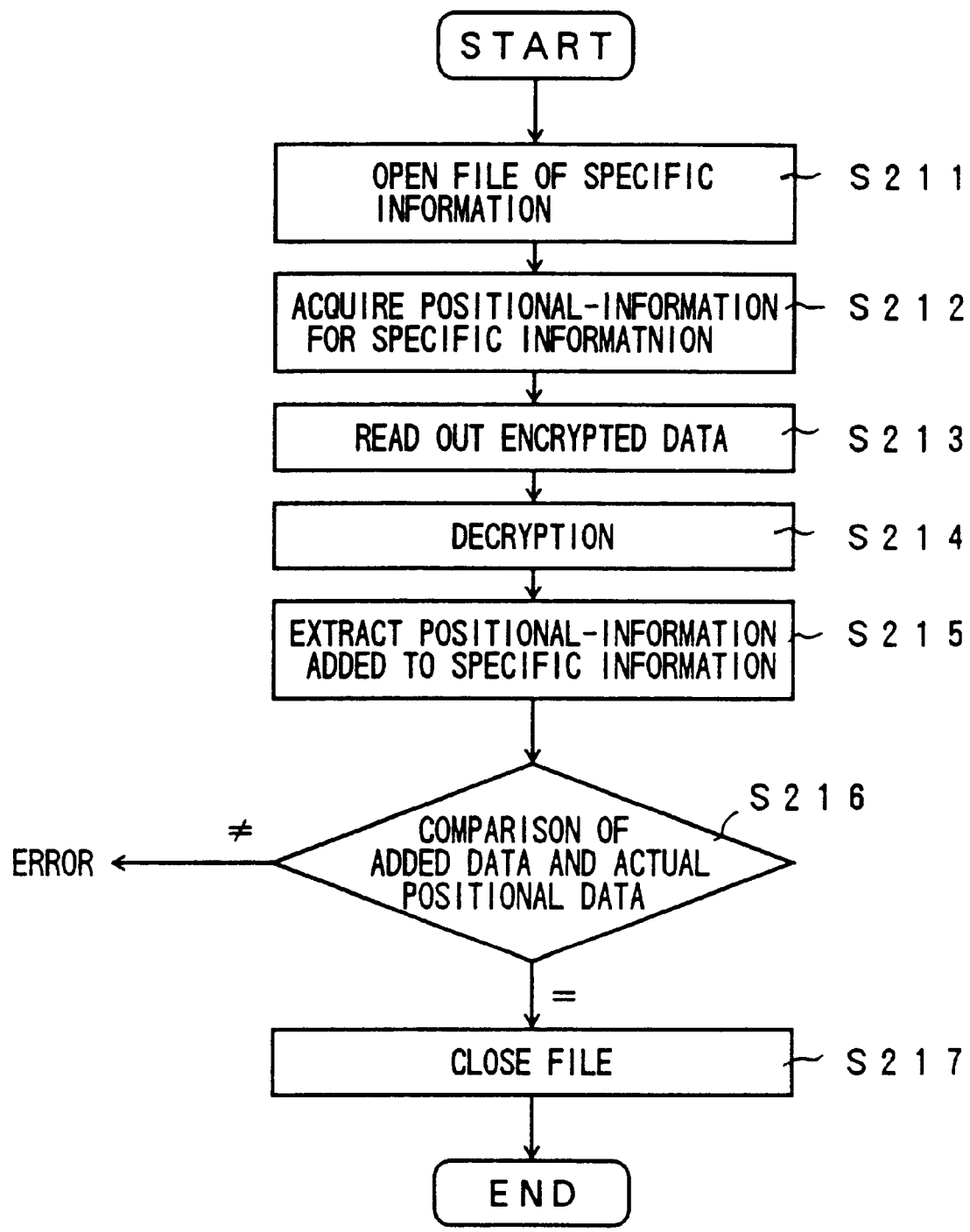
FIG. 11 is a flowchart illustrating a procedure in accordance with which the information (specific to the user system) is read out from the storage unit.

The computer unit 10 performs the process for reading out the protected machine specific information in accordance with a procedure as shown in FIG. 11. The process is typically illustrated in FIG. 10. A description will now be given, with reference to FIGS. 10 and 11, of the process.

When the file of the machine specific information is opened (S211), positional-information items i', j' and k' for areas in which information regarding the file is stored in the data management portion, the file-name management portion and the data portion of the storage unit 20 are successively retrieved based on the name of the file. The positional-information item k' for the area in which the encrypted data Ekey(DATA+k) (the encrypted machine specific information and positional-information item k) is stored is acquired (S212). The encrypted data Ekey(DATA+k) is read out from the area identified by the positional-information item k' in the storage unit 20 (S213). The encrypted data Ekey(DATA+k) read out from the storage unit 20 is stored in the memory 12 of the computer unit 10. After this, the encrypted data Ekey(DATA+k) stored in the memory 12 is decrypted by using the secret key (S214), so that the original data DATA and the positional-information item k added to the data DATA are separated from each other (S215). The positional-information item k obtained by the decryption process (S214 and S215) is compared with the positional-information item k' identifying the area in which the encrypted data Ekey (DATA+k) is stored. It is then determined whether or not those positional-information items k and k' are equal to each other (S216). A case where those positional-information items k and k' are equal to each other means that the file regarding the machine specific information is not moved or copied from another computer system. Thus, in this case, a process for closing the file is performed as a normal process (S217). The machine specific information obtained in the decryption process (S214 and S215) as described above is utilized in this user system. That is, the user informs the center about the machine specific information in order to buy the key (the license) used to open the lock of the desired software-article (see FIG. 9).

On the other hand, a case where those positional-information items k and k' differ from each other means that the file regarding the machine specific information is moved or copied from another computer system. In this case, an error signal is output, so that, for example, the process for the data read out from the storage unit 20 is compulsorily interrupted.

Positions at which files are stored in user systems under different using environments differ from each other. Thus, in the above embodiment, based on this matter, the user system detects that files stored in the user system has been moved or copied from another system without proper approval.

After the user buys from the center the key (the license) used to open the lock of the software-article as has been described above, a process for installing the software-article which is encrypted in the CD-ROM into the user system is performed by using the key (the license). The process for installing the software-article is performed in accordance with a procedure shown in FIG. 12.

Figure 12:
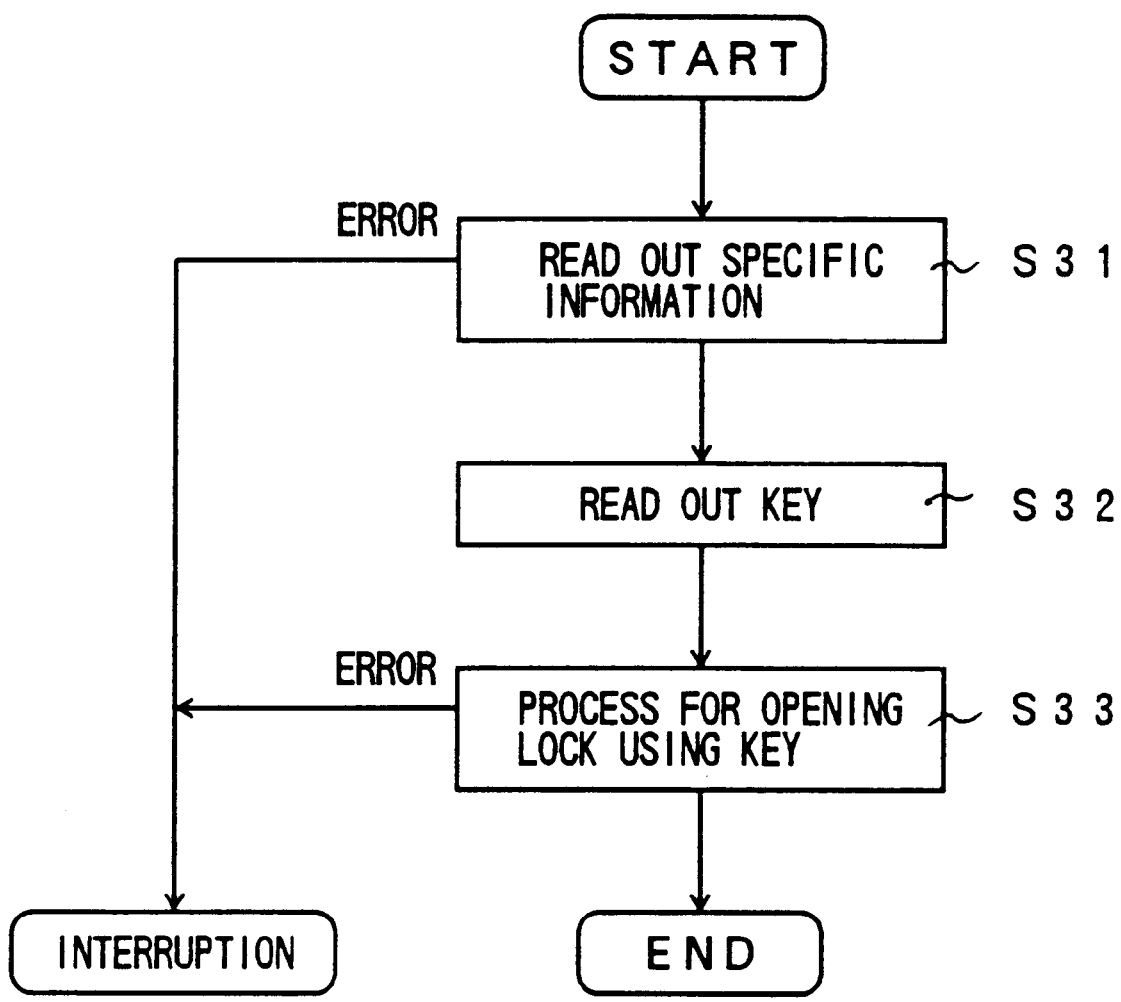
FIG. 12 is a flowchart illustrating a procedure in accordance with which the encrypted key is decrypted.
Figure 13:
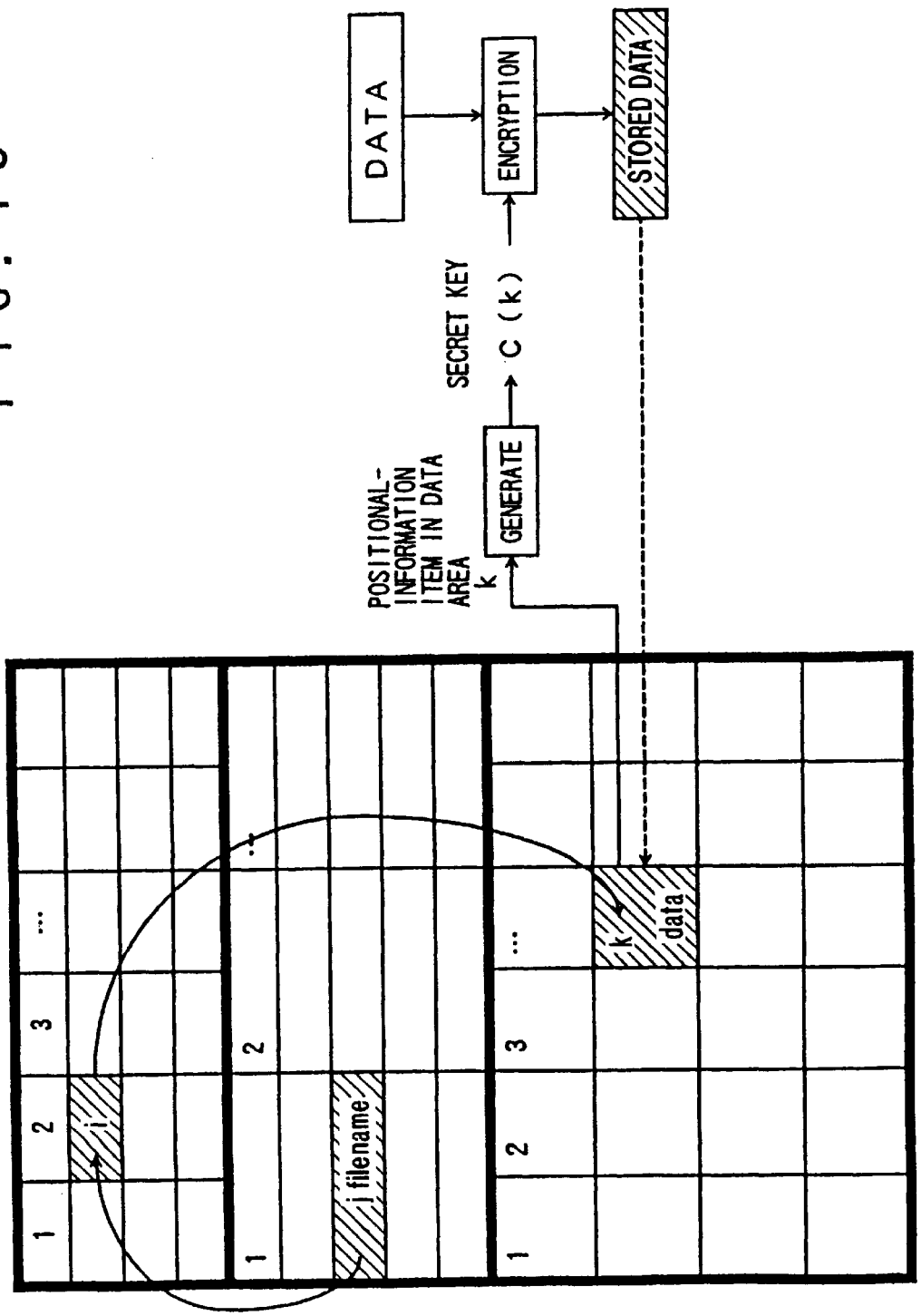
FIG. 13 is a diagram illustrating another example of a process for writing information of a file in the storage unit.
Figure 14:
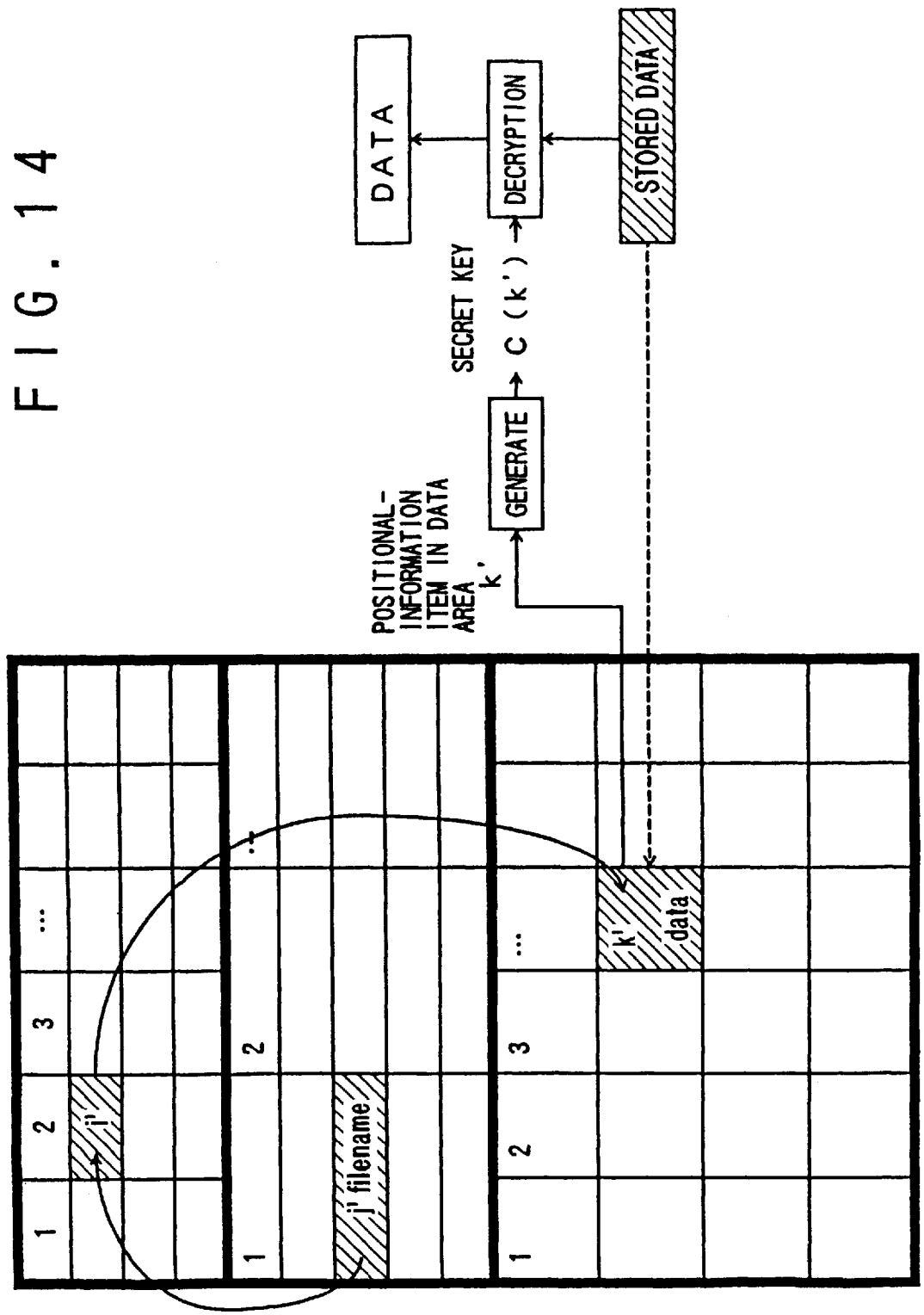
FIG. 14 is a diagram illustrating an example of a process for reading out the information of the file which was written in the storage unit by the process shown in FIG. 13.

Referring to FIG. 12, first of all, the machine specific information is read out from the storage unit 20 (S31). This process in step S31 is carried out in the same manner as the process shown in FIGS. 10 and 11. That is, after the encrypted data into which the machine specific information (DATA) and the positional-information item k are integrated is decrypted, it is determined whether or not the positional-information item k is equal to the positional-information item k' identifying the area from which the encrypted data is read out. If those positional-information items are not equal to each other, it is determined that the encrypted data has been illegally copied from another computer system. As a result, the error signal is output and the process is interrupted. On the other hand, if the above positional-information items are equal to each other, the process further proceeds using the machine specific information obtained by the decryption.

The encrypted key (the encrypted license) is read out from a predetermined area in the storage unit 20, and the encrypted key is decrypted by using the machine specific information which was read out in step S31 (S32). The process for opening the lock of the software-article (decrypting the software-article) is performed by using the key (the license) (S33). The software-article which is released from the protected state is then installed into the storage unit 20. If the software-article is not related to the key (the license), the process for opening the lock is not normally performed, so that the error signal is output and the process is interrupted.

The machine specific information is protected by using the positional-information item which is specific to the user system, so that the key used to open the lock of the software-article (to decrypt the encrypted software-article) is not obtained in a user system in which the machine specific information was copied from another user system. Thus, the software-articles (e.g., applications) which are supplied by using the CD-ROM as shown in FIG. 2 are protected with a high level of security.

A description will now be given, with reference to FIGS. 13 through 16, of other examples of the processes for storing and reading out the machine specific information.

Figure 15:
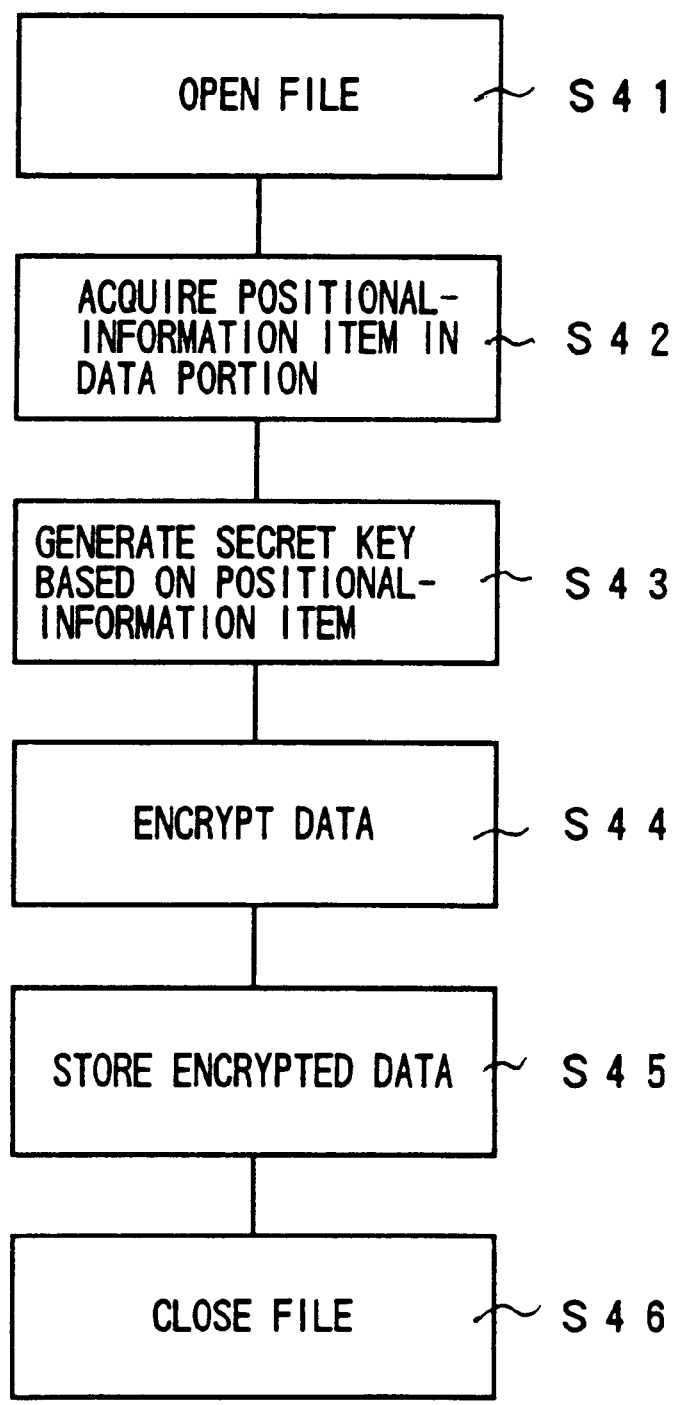
FIG. 15 is a flowchart illustrating a procedure of the process shown in FIG. 13.

In a case where the machine specific information which is to be protected is stored in the storage unit 20, the computer unit 10 executes a process, as shown in FIG. 15, which is a part of the process for storing the machine specific information in the storage unit 20. A procedure of the process shown in FIG. 15 is typically illustrated in FIG. 13.

In this case, after a file is opened, the positional-information k identifying the area in which the data (the machine specific information) should be stored in the data portion is acquired (S41 and S42). Information C(k) is generated based on the positional-information item k (S43). The data DATA (the machine specific information) is encrypted by using the information C(k) as a secret key (S44). The encrypted data Ec(k)(DATA) obtained in step S44 is then stored in the area which is identified by the positional-information item k in the data portion of the storage unit 20 (S45). After all of the information regarding the file is completely stored in the storage unit 20, the file is closed (S46).

Figure 16:
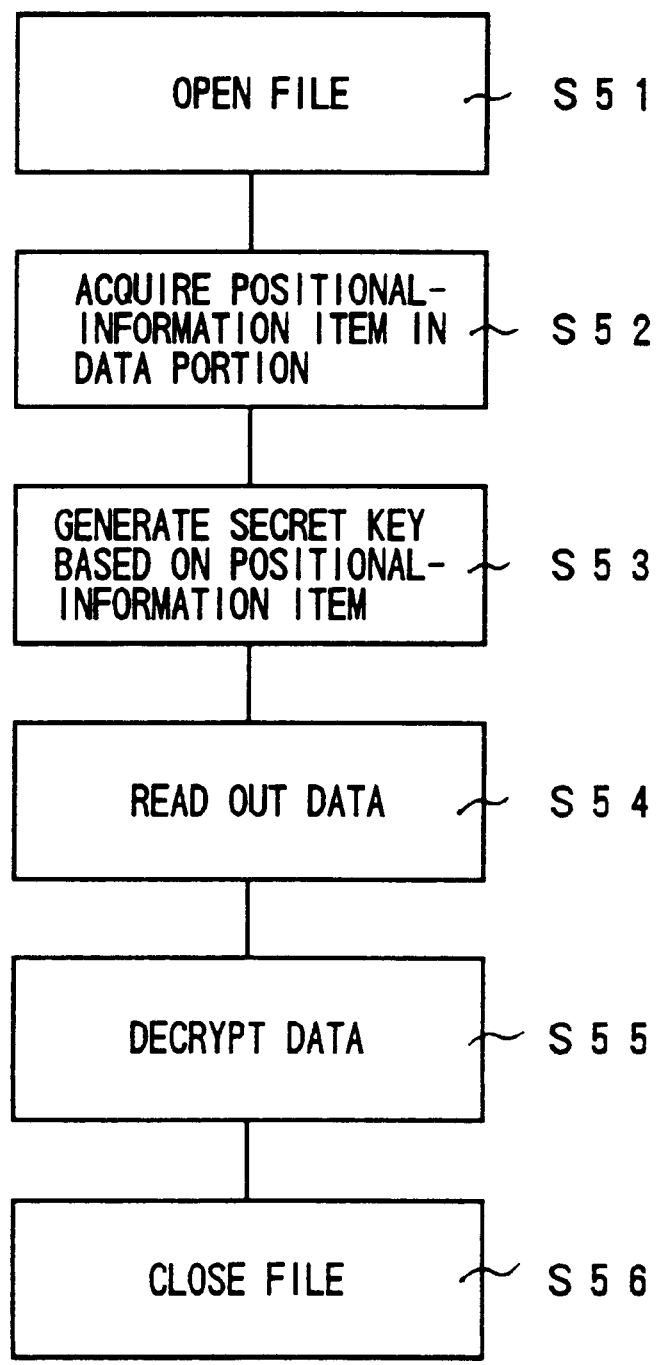
FIG. 16 is a flowchart illustrating a procedure of the process shown in FIG. 14.
Figure 17:
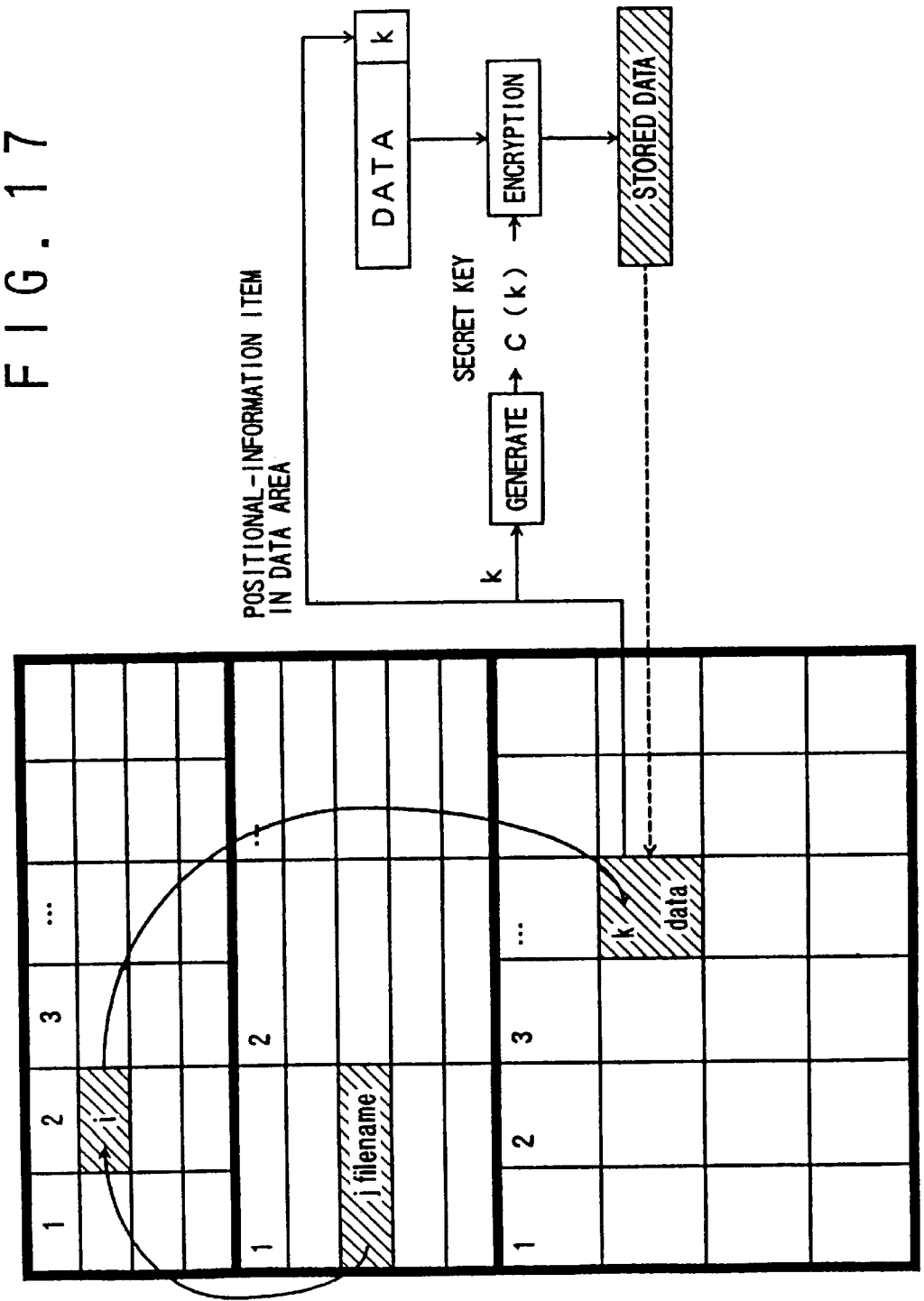
FIG. 17 is a diagram illustrating another example of a process for writing information of a file in the storage unit.
Figure 18:
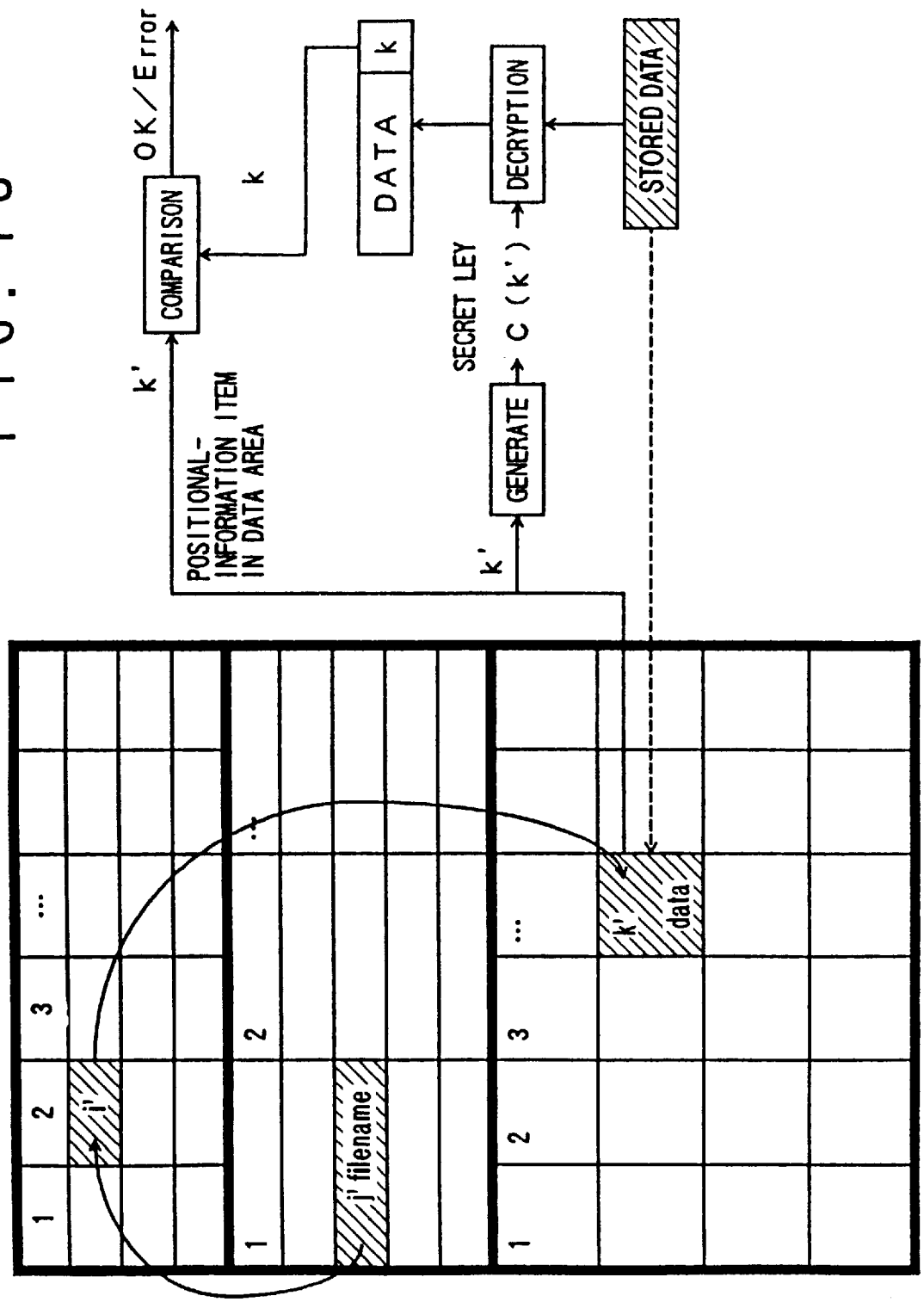
FIG. 18 is a diagram illustrating a process for read out the information of the file which was written in the storage unit by the process shown in FIG. 17.

In addition, in a case where the data (the machine specific information) of the protected file is read out from the storage unit 20, the computer unit 10 executes a process, as shown in FIG. 16, which is a part of the process for reading out the data. A procedure of the process shown in FIG. 16 is typically illustrated in FIG. 14.

In this case, after the file is opened, the positional-information item k' identifying the area in which the data is stored in the data portion is acquired (S51 and S52). Information C(k') is generated based on the positional-information item k' acquired in step S52 (S53). After this, the encrypted data Ec(k')(DATA)(the encrypted machine specific information) is read out from the area identified by the positional-information item k' in the data portion (S54). The encrypted data Ec(k')(DATA) is then decrypted by using the information C(k') as a secret key (S55). After this decryption of the encrypted data, the file is closed (S56).

If the positional-information item k' acquired as described above is equal to the positional-information item k acquired in the process for storing the data, the encrypted data Ec(k')(DATA) is exactly decrypted by using the secret key C(k'). The data obtained by decrypting the encrypted data is used as the correct machine specific information in the user system. On the other hand, if the file was moved or copied from another user system so that both the positional-information items k and k' differ from each other, the encrypted data Ec(k')(DATA) is not exactly decrypted by using the secret key C(k'). In this case, the correct data (the machine specific information) can not be restored.

A description will now be given, with reference to FIGS. 17 through 20, of another example.

Figure 19:
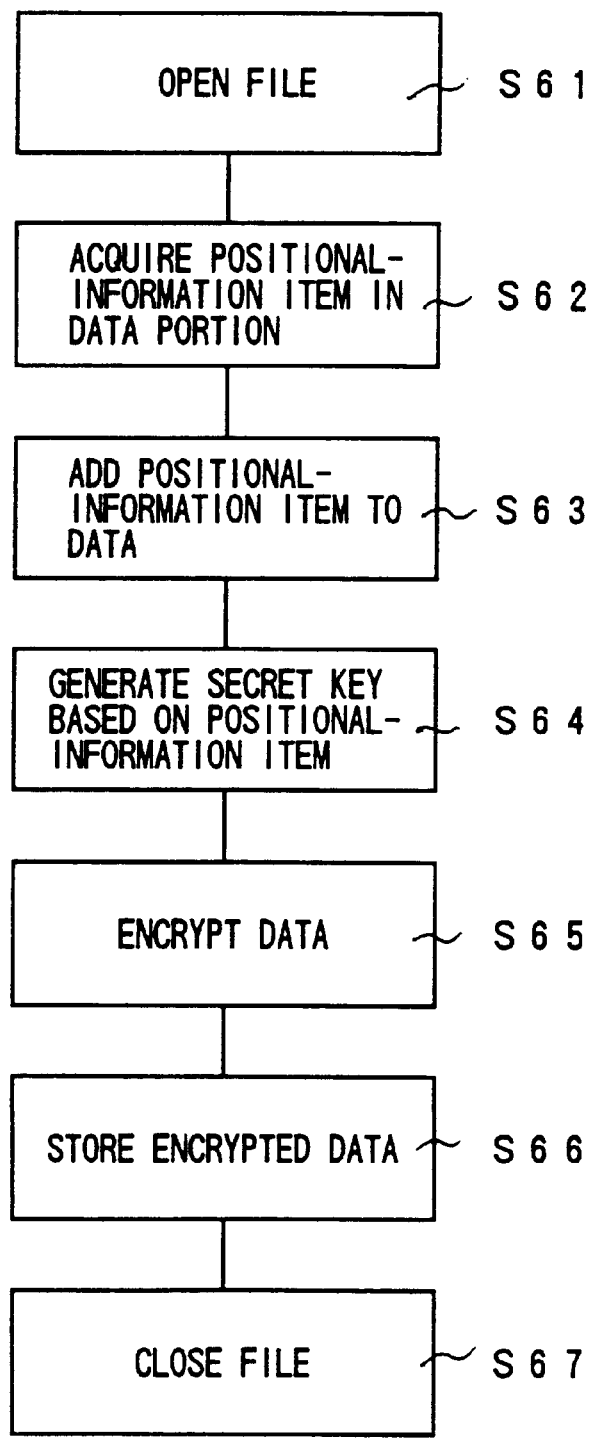
FIG. 19 is a flowchart illustrating a procedure of the process shown in FIG. 17.

In a case where a file of the machine specific information which is to be protected is stored in the storage unit 20, the computer unit 10 executes a process, as shown in FIG. 19, which is a part of the process for storing the information in the storage unit 20. A procedure of the process shown in FIG. 19 is typically illustrated in FIG. 16.

In this case, after the file is opened (S61), the positional-information item k identifying the area in which the data should be stored in the data portion is acquired (S62). The positional-information item k acquired in step S62 is added to the data (the machine specific information (S63), and information C(k) is then generated based on the positional-information item k (S64). Data (DATA+k) into which the data (the machine specific information) and the positional-information item k are integrated is encrypted by using the information C(k) as a secret key (S65). The encrypted data Ec(k)(DATA+k) is stored in the area identified by the positional-information item k in the data portion of the storage unit 20 (S66). After all information regarding the file is completely stored in the storage unit, the file is closed (S67).

Figure 20:
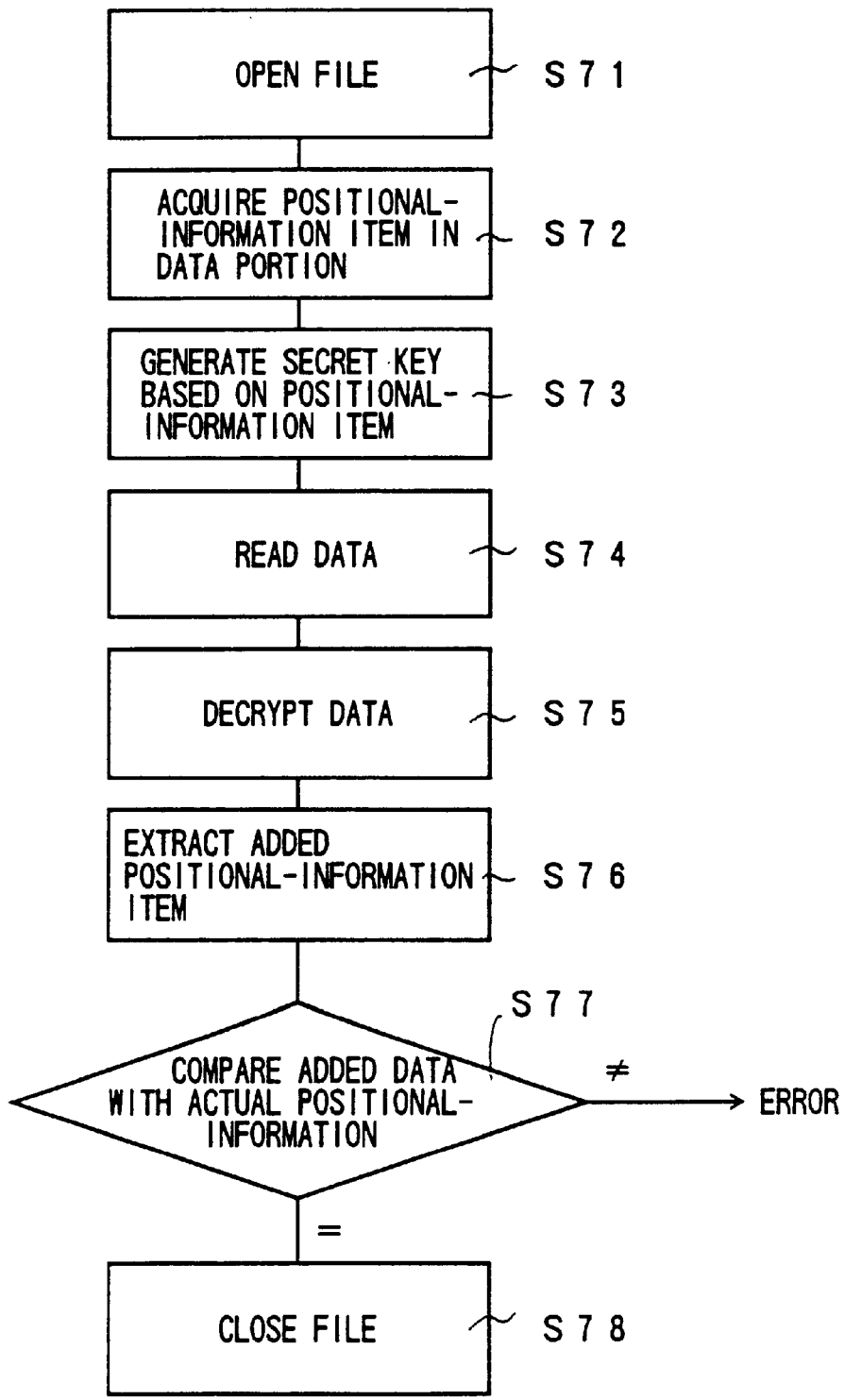
FIG. 20 is a flowchart illustrating a procedure of the process shown in FIG. 18.

In addition, in a case where the data of the protected file is read out from the storage unit 20, the computer unit 10 executes a process, as shown in FIG. 20, which is a part of the process for reading out the data from the storage unit. A procedure of the process shown in FIG. 20 is typically illustrated in FIG. 18.

In this case, after the file is opened, the positional-information item k' identifying the area in which the data (the machine specific information) is stored is acquired (S71 and S72). Information C(k') is generated based on the positional-information k' acquired in step S72 (S73). After this, the encrypted data Ec(k')(DATA+k) is read out from the area, identified by the positional-information item k', in the data portion of the storage unit 20 (S74). The encrypted data Ec(k')(DATA+k) is then decrypted by using the information C(k') as the secret key (S75). The positional-information item k is extracted from the data (DATA+k) obtained by the decryption (S76), and the positional-information item k is compared with the positional-information identifying the area in which the data is actually stored (S77). In a case where these positional-information items k and k' are equal to each other, the file is closed (S78).

In the case where the positional-information items k and k' are equal to each other, the encrypted data Ec(k')(DATA+k) is exactly decrypted by using the secret key C(k'). The correct data (the machine specific information) is extracted from the data (DATA+k) obtained by the decryption is used in the user system. On the other hand, in a case where the positional-information items k and k' differ from each other, the error signal is output. In this case, the encrypted data Ec(k')(DATA+k) is not exactly decrypted by using the secret key C(k'), so that the correct data (the machine specific information) can not be restored. In the process as described above, the user can determine, based on the error signal, whether the decrypted data is the correct data before actually using the decrypted data.

In the above embodiments, the positional-information items i, j, and k identifying areas in which information is stored in the storage unit 20 are decided based on random numbers. However, in general computer systems, the positional-information items are decided in accordance with a predetermined algorithm. In a normal filing operation, for example, if a free area is detected while the storage unit 20 is being scanned from a head thereof, the free area is decided as the area used to store information. Thus, in new user systems, areas identified by the same positional-information items may be accidentally decided as areas in which the data should be stored. Hence, a description will now be given of another example which prevents areas identified by the same positional-information items from being determined as areas in which data should be stored in the respective user systems.

Figure 23:
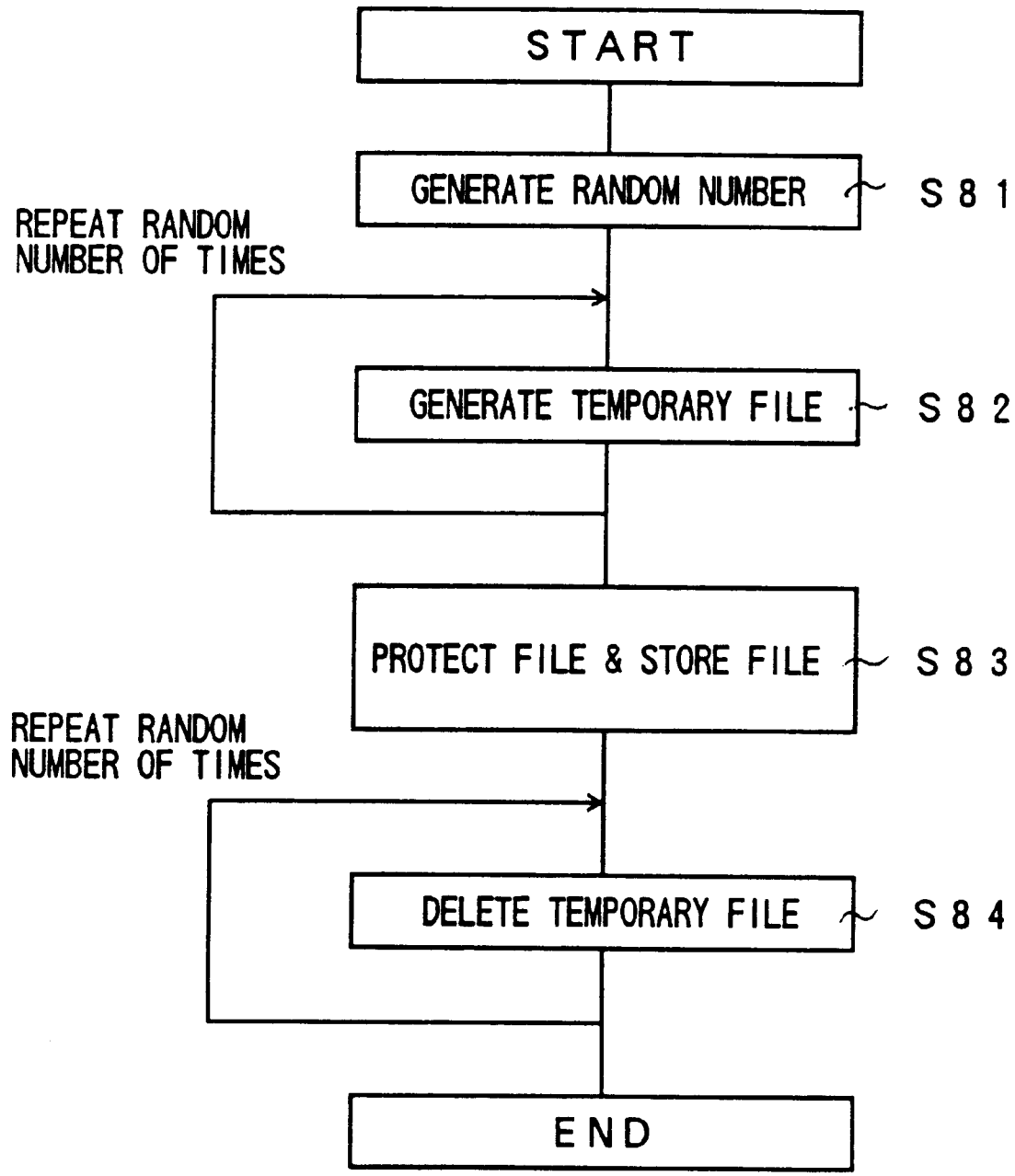
FIG. 23 is a diagram illustrating an example of a method for selling and utilizing software.

In this embodiment, the process for storing the data is performed in accordance with a procedure shown in FIG. 23.

Figure 21:
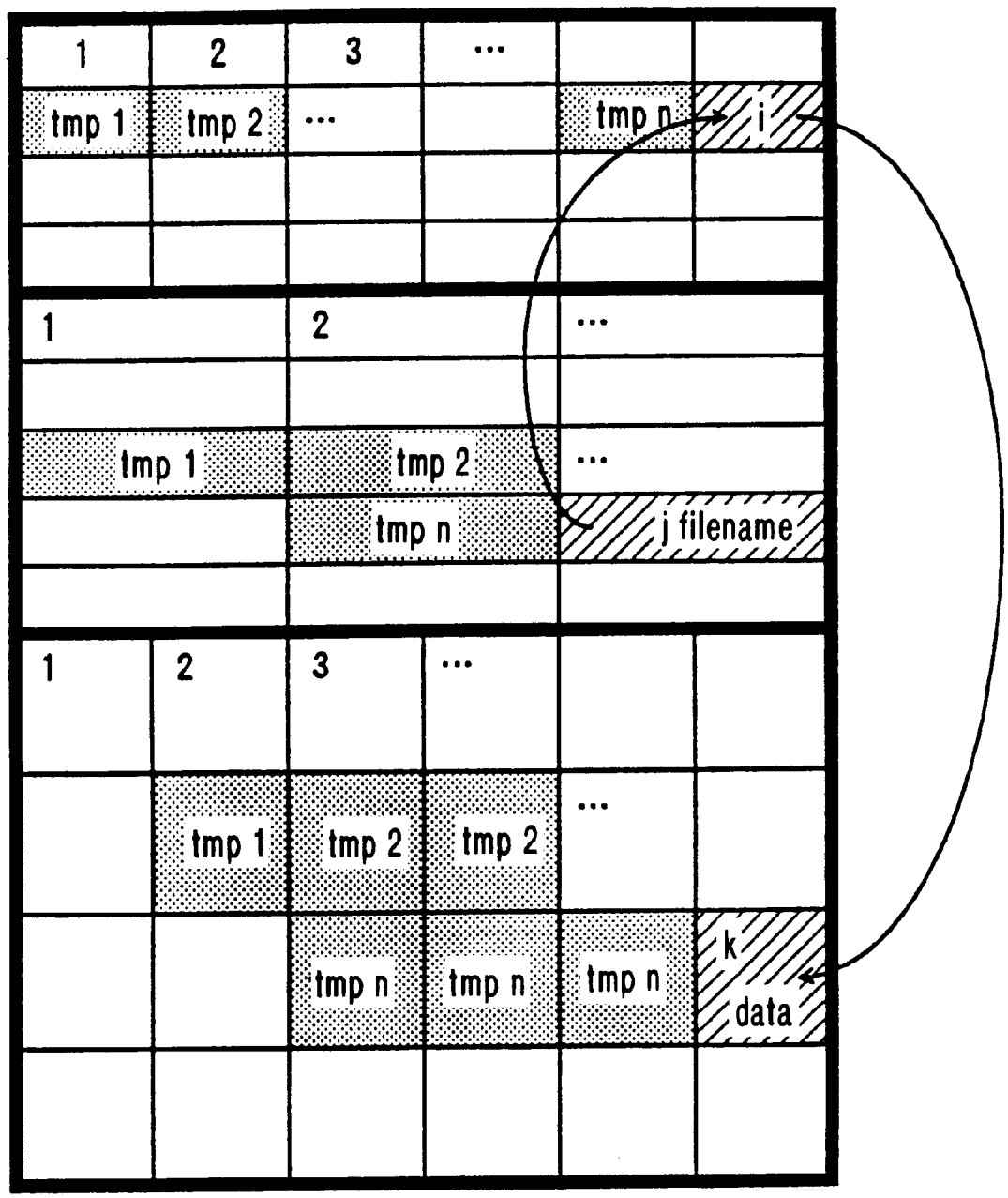
FIG. 21 is a diagram illustrating a state where temporary files and files to be protected in the storage unit.
Figure 22:
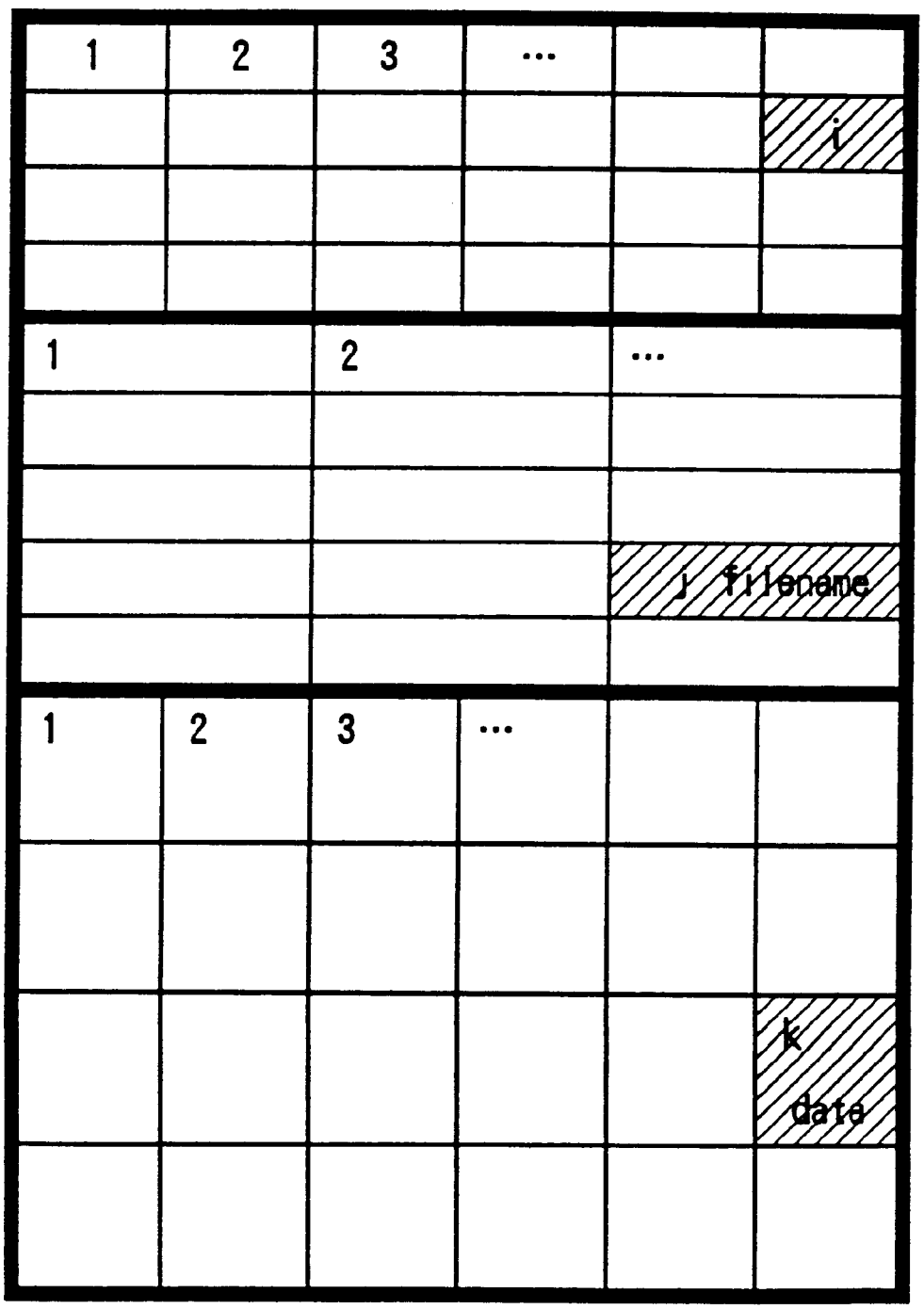
FIG. 22 is a diagram illustrating a state where the temporary files are eliminated from the storage unit.

Referring to FIG. 23, a random number is generated (S81), and the random number n of temporary files is then formed (S82). Each of the temporary files has meaningless data. Pieces of information of the temporary files (temp 1, temp 2, . . . , and temp n) are stored, as shown in FIG. 21, in areas in the data portion, the file-name management portion and the data management portion of the storage unit 20, which areas are decided in a predetermined algorithm. After this, pieces of information regarding a file of the machine specific information which should be protected are stored in areas in the storage unit 20 by one of the processes as described above (see FIGS. 6, 15 and 19), which areas are decided in accordance with the predetermined algorithm. As a result, the storage unit 20 is provided with a plurality of temporary files and the file which should be protected as shown in FIG. 21.

After this, all the number n (the random number) of temporary files is deleted from the storage unit 20 (S84). As a result, only the protected file remains in the storage unit 20.

The file which has been stored in the storage unit 20 in accordance with the process described above is read out from the storage unit 20 in accordance with a corresponding one of the processes for reading out the data (see FIGS. 11, 16 and 20).

In the embodiment described above, after storing a plurality of temporary files, the file which should be protected is stored in the storage unit 20, and the temporary files are then deleted from the storage unit 20. Thus, there may be little probability that areas identified by the same positional-information items are accidentally decided as areas in which the data should be stored in a plurality of user systems.

In the above process, the number of temporary files which should be pre-stored in the storage unit 20 is based on a random number. However, a constant number of temporary files may be stored in the storage unit 20. The temporary files may have the same size and different sizes. In a case where the temporary files having the different sizes are stored in the storage unit 20, the size of each of the temporary files is decided, for example, based on a random number.

In the above embodiments, the positional-information item k identifying the area in the data portion of the storage unit 20 is used as data added to the protected data and to make the secret key. However, the positional-information items i and j identifying areas in the data management portion and the file-name management portion of the storage unit 20 and any combination thereof may also be used as the data added to the protected data and to make the secret key. In these cases, in the process for reading out the protected data, information corresponding to information used to encrypt the data is used to decrypt the encrypted data and to determine whether or not the file read out from the storage unit is correct file.

In the above embodiments, the present invention is used to protect the machine specific information corresponding to the key (the license) for releasing the software-articles, which are sold in the protected state, from the protected state. However, the present invention may be used to protect other kinds of information.

The present invention is not limited to the aforementioned embodiments, and other variations, and modifications may be made without departing from the scope of the claimed invention.

What is claimed is:

1. A file protection system for protecting a file stored in a storage unit, comprising:
   storage position deciding means for deciding positional-information identifying an area in which information of the file is stored in said storage unit; and encryption means for encrypting the information of the file in accordance with a predetermined algorithm using the positional-information decided by said storage position deciding means, wherein information encrypted by said encryption means is stored in the area identified by the positional-information in said storage unit.

2. The file protection system as claimed in claim 1, wherein said encryption means comprises:

means for adding a part of the positional-information to the information of the file; and means for encrypting information obtained by said adding means using a predetermined secret key.

3. The file protection system as claimed in claim 1, wherein said encryption means comprises:

means for making a secret key based on a part of the positional-information; and means for encrypting the data of the file using the secret key.

4. The file protection system as claimed in claim 1, wherein said encryption means comprises:

means for adding a part of the positional-information to the information of the file;

means for making a secret key based on the part of the positional-information; and means for encrypting the information added by said adding means using the secret key.

5. The file protection system as claimed in claim 1, wherein said storage unit has a logic structure comprising;

a data portion for storing the information of the file;

a data management portion for storing information used to manage a position at which the information of the file is stored in the data portion; and a file-name management portion for storing information used to manage a relationship between a name of the file and a position at which the information is stored in the data management portion, wherein said encryption means encrypts the information of the file using one of positional-information identifying positions at which information is stored in said data portion, the data management portion and the file-name management portion.

6. The file protection system as claimed in claim 2, wherein said storage unit has a logic structure comprising:

a data portion for storing the information of the file;

a data management portion for storing information used to manage a position at which the information of the file is stored in the data portion; and a file-name management portion for storing information used to manage a relationship between a name of the file and a position at which the information is stored in the data management portion, wherein said adding means of said encryption means adds one of positional-information identifying positions at which information is stored in said data portion, the data management portion, and the file-name management portion, to the information of the file.

7. The file protection system as claimed in claim 3, wherein said storage unit has a logic structure comprising;

a data portion for storing the information of the file;

a data management portion for storing information used to manage a position at which the information of the file is stored in the data portion; and a file-name management portion for storing information used to manage a relationship between a name of the file and a position at which the information is stored in the data management portion, wherein said adding means of said encryption means makes the secret key based on one of positional-information identifying positions at which information is stored in said data portion, the data management portion and the file-name management portion.

8. The file protection system as claimed in claim 4, wherein said storage unit has a logic structure comprising;

a data portion for storing the information of the file;

a data management portion for storing information used to manage a position at which the information of the file is stored in the data portion; and a file-name management portion for storing information used to manage a relationship between a name of the file and a position at which the information is stored in the data management portion, wherein said adding means of said encryption means adds one of positional-information identifying positions at which information is stored in said data portion, the data management portion, and the file-name management portion, to the information of the file, and said secret key making means of said encryption means makes the secret key based on the positional-information.

9. The file protection system as claimed in claim 1, wherein storage position deciding mean has random number generating means for generating a random number, a part of the positional information being decided based on the random number generated by said random number generating means.

10. The file protection system as claimed in claim 9, further comprising:

temporary file storing means for storing a temporary file decided based on the random number in an area which is decided in accordance with a predetermined algorithm in said storage unit;

means for deciding the positional-information required to store the information of the file in accordance with the predetermined algorithm after the temporary file is stored in said storage unit; and means for deleting the temporary file from said storage unit after the positional-information is decided.

11. A file protection system operable in response to information of a file which was encrypted using positional-information being read from a storage unit, the positional-information being a part of information corresponding to an area in which encrypted information is stored in said storage unit, said file protection system comprising:

decryption means for decrypting the encrypted information of the file which is read from an area in said storage unit using information corresponding to the area, in accordance with an algorithm corresponding to an algorithm with which the information of the file was encrypted;

extracting means for extracting the positional-information used to encrypt the information of the file from information obtained by said decryption means; and determination means for determining whether the positional-information extracted by said extracting means is equal to corresponding positional-information which is a part of the information corresponding to the area from which the encrypted information of the file is read, wherein information decrypted by said decryption means is determined to exclude correct information of the file in response to said determination means determining that the positional-information extracted by said extracting means is not equal to the positional-information used to read the encrypted information of the file.

12. The file protection system as claimed in claim 11, wherein information obtained by adding the positional-information to the information of the file is encrypted using a secret key, and wherein said extracting means has separation means for separating the positional-information from the information of the file in the information obtained by said decryption means.

13. The file protection system as claimed in claim 11, wherein the information of the file is encrypted using a secret key generated based on the positional-information, and wherein said decryption means comprises:

first means for generating the secret key based on the corresponding positional-information used to read out the encrypted information of the file from the storage unit; and second means for decrypting the information read from said storage unit using the secret key obtained by said first means.

14. The file protection system as claimed in claim 11, wherein information obtained by adding the positional-information read from the storage unit to the information of the file is encrypted using a secret key generated based on the positional-information, wherein said decryption means comprises:

first means for generating a secret key based on the corresponding positional-information used to read the encrypted information of the file from the storage unit; and second means for decrypting the information read from said storage unit using the secret key obtained by said first means, and wherein said extracting means has separation means for separating the positional-information from the information of the file in the information obtained by said second means of said decryption means.

15. A software utilization system comprising:

a storage unit for storing information in an area identified by positional-information supplied thereto;

storage position deciding means for deciding positional-information used to store specific information which is information specific to said software utilization system in said storage unit;

encryption means for encrypting the specific information using at least a part of the positional-information decided by said storage position deciding means in accordance with a predetermined algorithm;

storage control means for storing information obtained by said encryption means in an area identified by the positional-information decided by said storage position deciding means in said storage unit;

first decryption means for decrypting encrypted information which is read out from said storage unit using the positional information, in accordance with an algorithm according to the predetermined algorithm used by said encryption means to encrypt the specific information;

extracting means for extracting the specific information and at least the positional-information used to encrypt the specific information from information obtained by said first decryption means;

determination means for determining whether at least the part of the positional-information actually extracted by said extracting means is equal to a corresponding part of the positional-information used to read out the encrypted information from said storage unit;

second decryption means for, when said determination means determines that at least the part of the positional-information actually extracted by said extracting means is equal to the corresponding part of the positional-information used to read out the encrypted information, decrypting a key using the specific information extracted by said extracting means, the key being supplied from an external system to decrypt encrypted software-articles and being encrypted by the specific information; and third decryption means for decrypting an encrypted software-article, supplied from an external system, using the key decrypted by said second decryption means.

16. The software utilization system as claimed in claim 15, wherein said encryption means includes:

first means for adding at least the part of the positional-information to the specific information; and second means for encrypting information obtained by said first means using a predetermined secret key.

17. The software utilization system as claimed in claim 15 further comprising:

specific information generating means for generating the specific information to be stored in said storage unit.

18. The software utilization system as claimed in claim 15, further comprising random number generating means for generating a random number so that the specific information is generated based on the random number.

19. The software utilization system as claimed in claim 15, wherein a software-article utilized in said software utilization system is encrypted and stored in a storage medium supplied thereto, and wherein said software utilization system further comprise means for reading out the encrypted software-article from said storage medium.

20. A software utilization system comprising:

storage unit for storing information in an area identified by positional-information supplied thereto;

storage position deciding means for deciding positional-information used to store specific information which is information specific to said software utilization system in said storage unit;

first secret key generating means for generating a secret key based on at least a part of the positional-information decided by said storage position deciding means;

encryption means for encrypting the specific information using the secret key generated by said first secret key generating means;

storage control means for storing information obtained by said encryption means in an area identified by the positional-information decided by said storage position deciding means in said storage unit;

second secret key generating means for, where the encrypted specific information is read out from said storage unit using the positional-information, generating a secret key based on a part of the positional-information used to read out the specific information corresponding to at least the part of the positional-information used to encrypt the specific information;

first decryption means for decrypting encrypted information which is read out from said storage unit using the positional information and using the secret key generated by said second secret key generating means to obtain the specific information;

second decryption means for decrypting a key using the specific information, the key being supplied from an external system to decrypt encrypted software-articles and being encrypted by the specific information obtained by said first decryption means; and third decryption means for decrypting an encrypted software-article, supplied from an external system, using the key decrypted by said second decryption means.

21. The software utilization system as claimed in claim 20 further comprising:

specific information generating means for generating the specific information to be stored in said storage unit.

22. The software utilization system as claimed in claim 20, further comprising random number generating means for generating a random number so that the specific information is generated based on the random number.

23. The software utilization system as claimed in claim 20, wherein software-article utilized in said software utilization system is encrypted and stored in a storage medium supplied thereto, and wherein said software utilization system further comprise means for read out the encrypted software-article from said storage medium.

24. A software utilization system comprising:

storage unit for storing information in an area identified by positional-information supplied thereto;

storage position deciding means for deciding positional-information used to store specific information which is information specific to said software utilization system in said storage unit;

information adding means for adding at least a part of the positional-information decided by said storage position deciding means to the specific information;

first secret key generating means for generating a secret key based on at least the part of the positional-information;

encryption means for encrypting information obtained by said information adding means using the secret key generated by said first secret key generating means;

storage control means for storing information obtained by said encryption means in an area identified by the positional-information decided by said storage position deciding means in said storage unit;

second secret key generating means for, where the encrypted specific information is read out from said storage unit using the positional-information, generating a secret key based on a part of the positional-information used to read out the specific information corresponding to at least the part of the positional-information used to encrypt the specific information;

first decryption means for decrypting encrypted information which is read out from said storage unit using the positional information and using the secret key generated by said second secret key generating means to obtain the specific information;

extracting means for extracting the specific information and at least the positional-information used to encrypt the specific information from information obtained by said first decryption means;

determination means for determining whether at least the part of the positional-information actually extracted by said extracting means is equal to a corresponding part of the positional-information used to read out the encrypted information from said storage unit;

second decryption means for, when said determination means determines that at least the part of the positional-information actually extracted by said extracting means is equal to the corresponding part of the positional-information used to read out the encrypted information, decrypting a key using the specific information extracted by said extracting means, the key being supplied from an external system to decrypt encrypted software-articles and being encrypted by the specific information; and third decryption means for decrypting an encrypted software-article, supplied from an external system, using the key decrypted by said second decryption means.

25. The software utilization system as claimed in claim 24 further comprising:

specific information generating means for generating the specific information to be stored in said storage unit.

26. The software utilization system as claimed in claim 24, further comprising random number generating means for generating a random number so that the specific information is generated based on the random number.

27. The software utilization system as claimed in claim 24, wherein a software-article utilized in said software utilization system is encrypted and stored in a storage medium supplied thereto, and wherein said software utilization system further comprises means for reading out the encrypted software-article from said storage medium.

28. A storage medium used in a software utilization system for utilizing software-articles which are encrypted, said storage medium comprising:

a region in which an encrypted software-article useable in said software utilization system and information used to read out the encrypted software-article are recorded; and a region in which information used to generate specific information is stored, the specific information being information specific to said software utilization system.

\* \* \* \* \*